(12) United States Patent
Hayashi

(10) Patent No.: US 7,089,321 B2
(45) Date of Patent: Aug. 8, 2006

(54) WIRELESS DATA TRANSMITTING AND RECEIVING SYSTEM, SERVER DEVICE, AND SERVER DEVICE CONTROLLING METHOD

(75) Inventor: Morihiko Hayashi, Kanagawa (JP)

(73) Assignee: Sony Corporation (JP)

( * ) Notice: Subject to any disclaimer, the term of this patent is extended or adjusted under 35 U.S.C. 154(b) by 854 days.

(21) Appl. No.: 09/977,808

(22) Filed: Oct. 15, 2001

(65) Prior Publication Data

US 2002/0073229 A1    Jun. 13, 2002

(30) Foreign Application Priority Data

Oct. 19, 2000 (JP) ............................ P2000-319278
Sep. 20, 2001 (JP) ............................ P2001-287882

(51) Int. Cl.
G06F 1/24 (2006.01)
G06F 17/27 (2006.01)
H04M 3/00 (2006.01)

(52) U.S. Cl. ..................................... 709/237; 713/170

(58) Field of Classification Search ................ 709/237, 709/245–246; 713/160–181; 370/211, 230, 370/235; 455/567; 380/277–279
See application file for complete search history.

(56) References Cited

U.S. PATENT DOCUMENTS

| | | | | |
|---|---|---|---|---|
| 5,884,032 A * | 3/1999 | Bateman et al. | ............ | 709/204 |
| 6,182,214 B1 * | 1/2001 | Hardjono | ............... | 713/163 |
| 6,452,915 B1 * | 9/2002 | Jorgensen | ............... | 370/338 |
| 6,480,957 B1 * | 11/2002 | Liao et al. | ............... | 713/170 |
| 6,590,588 B1 * | 7/2003 | Lincke et al. | ............... | 715/744 |
| 6,754,825 B1 * | 6/2004 | Lennie et al. | ............... | 713/181 |
| 6,757,291 B1 * | 6/2004 | Hu | ............... | 370/401 |
| 6,834,341 B1 * | 12/2004 | Bahl et al. | ............... | 713/156 |

* cited by examiner

*Primary Examiner*—David Wiley
*Assistant Examiner*—Jude Jean-Gilles
(74) *Attorney, Agent, or Firm*—Lerner, David, Littenberg, Krumholz & Mentlik, LLP

(57) ABSTRACT

A wireless data transmitting and receiving system is disclosed which comprises a server device connected wirelessly to a plurality of client devices constituting a wireless network. The system allows the server device to transmit externally acquired reproduction-destined data to specific client devices in a secure manner.

17 Claims, 18 Drawing Sheets

LAYOUT OF PACKET IN WHICH TO TRANSMIT MAIN DATA

LAYOUT OF PACKET IN WHICH TO TRANSMIT REQUEST DATA

FIG. 6

| NETWORK<br>TECHNOLOGY | ON THE SAME NETWORK (e.g., HOUSEHOLD) | | NEIGHBORING NETWORK (e.g., NEXT-DOOR NEIGHBOR) |
|---|---|---|---|
| | DEVICE ID=01 | DEVICE ID=02 | DEVICE ID=01 |
| ENCRYPTION | DECRYPTABLE | DECRYPTABLE | NON-DECRYPTABLE |
| DEVICE ID | ONLY PACKETS HAVING THE OWN DEVICE ID OR PACKETS DESTINED FOR ALL DEVICES ARE RECEIVABLE | ONLY PACKETS HAVING THE OWN DEVICE ID OR PACKETS DESTINED FOR ALL DEVICES ARE RECEIVABLE | |

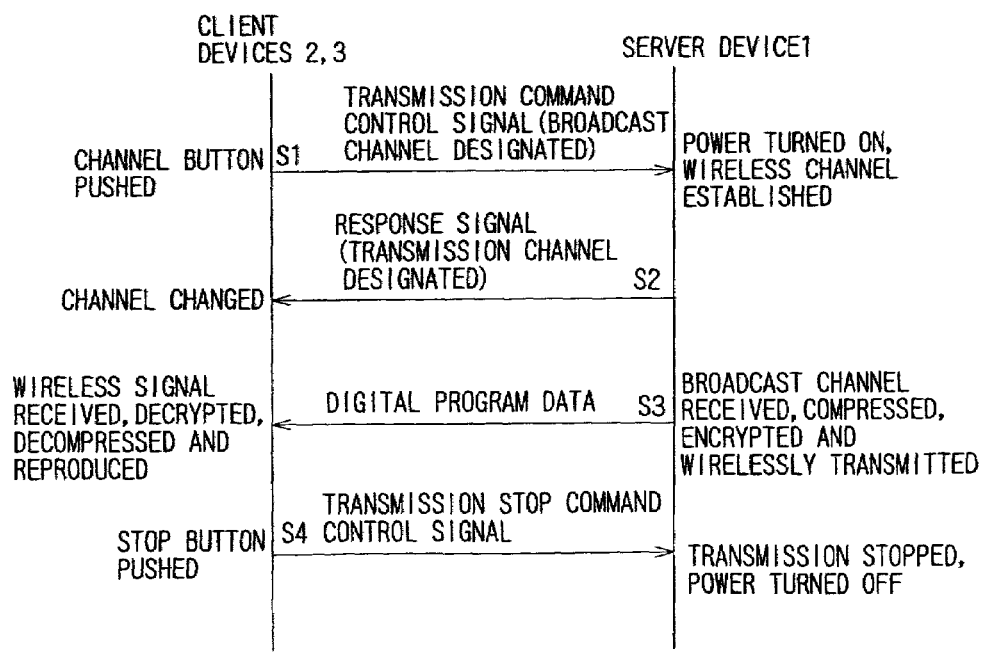

FIG. 7

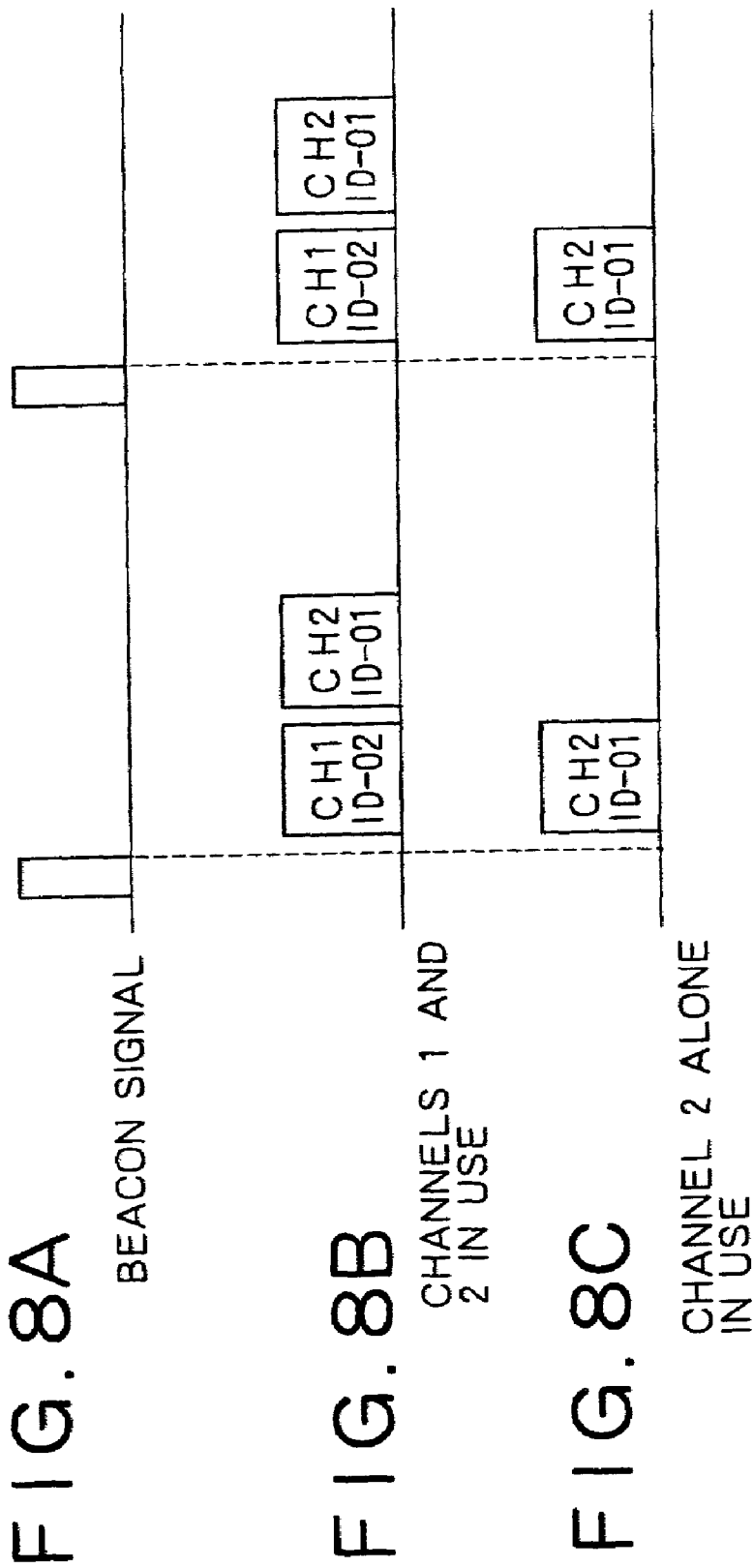

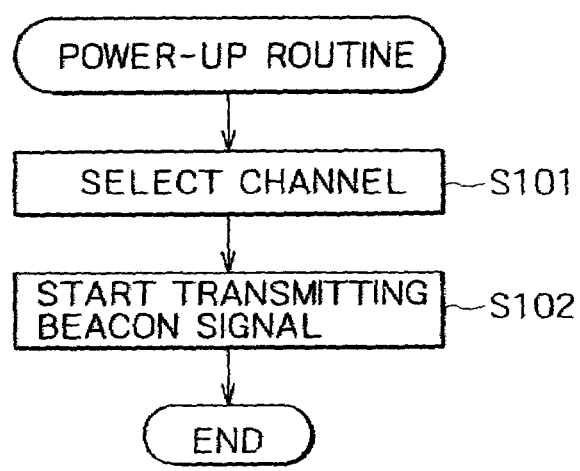

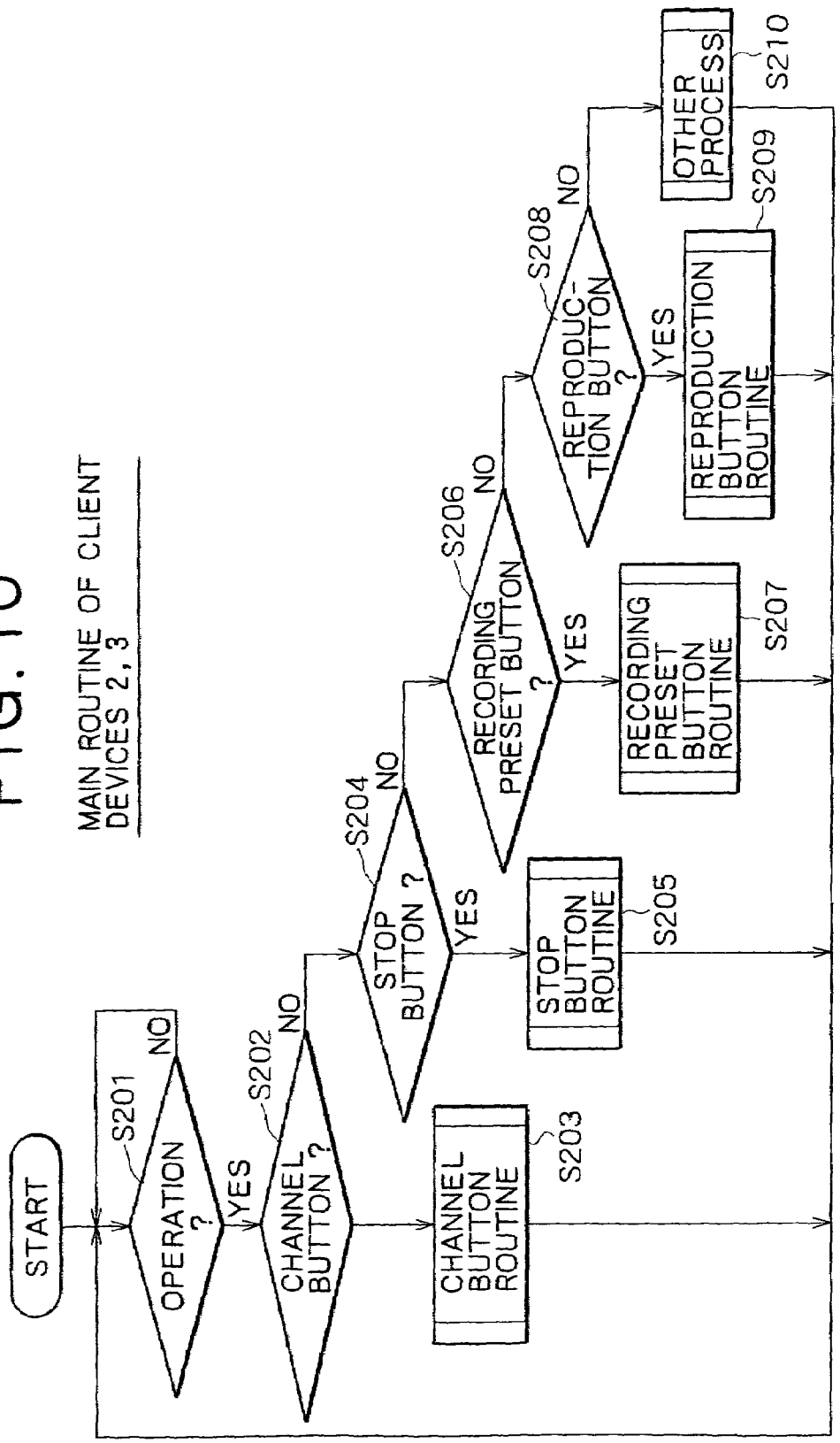

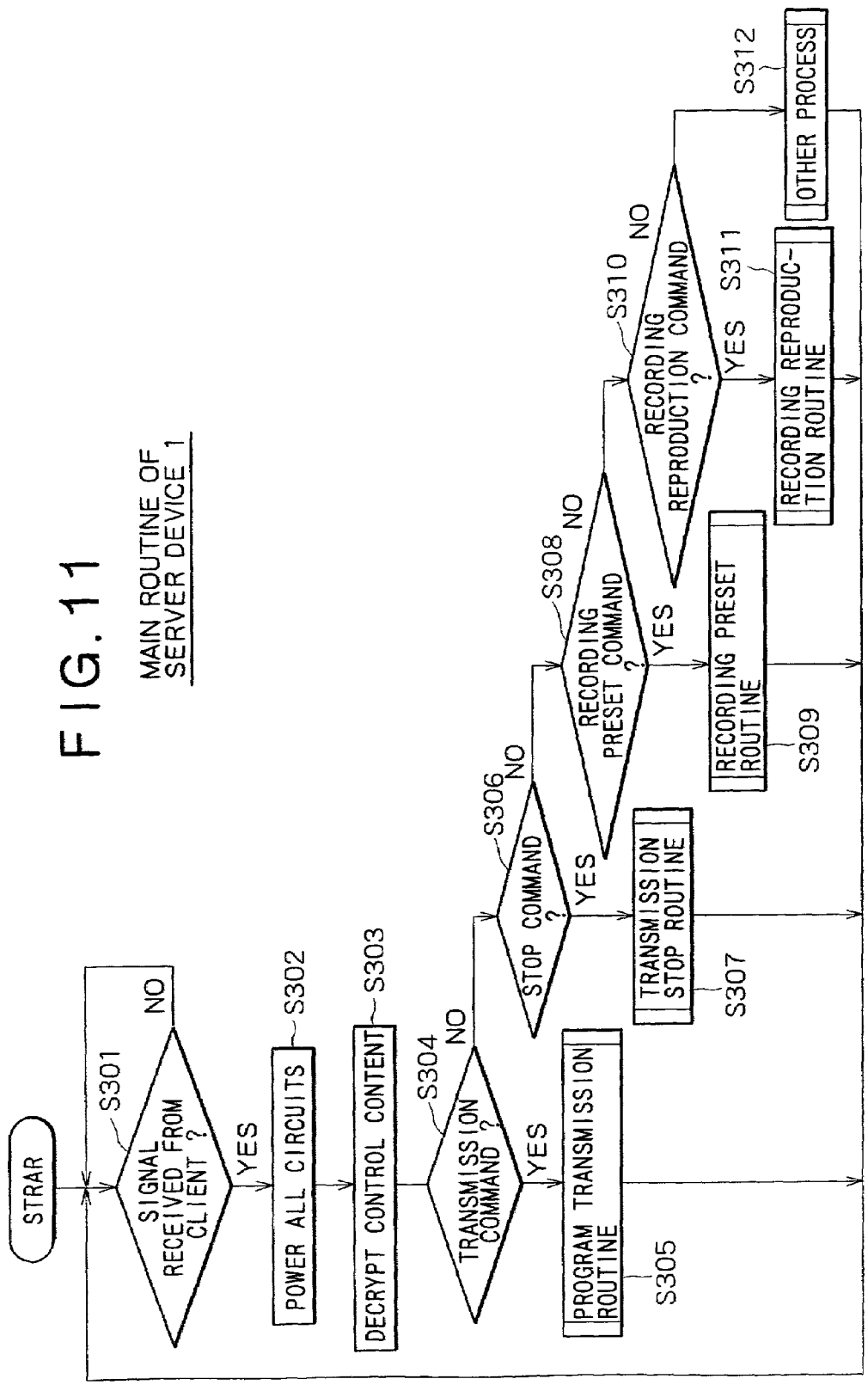

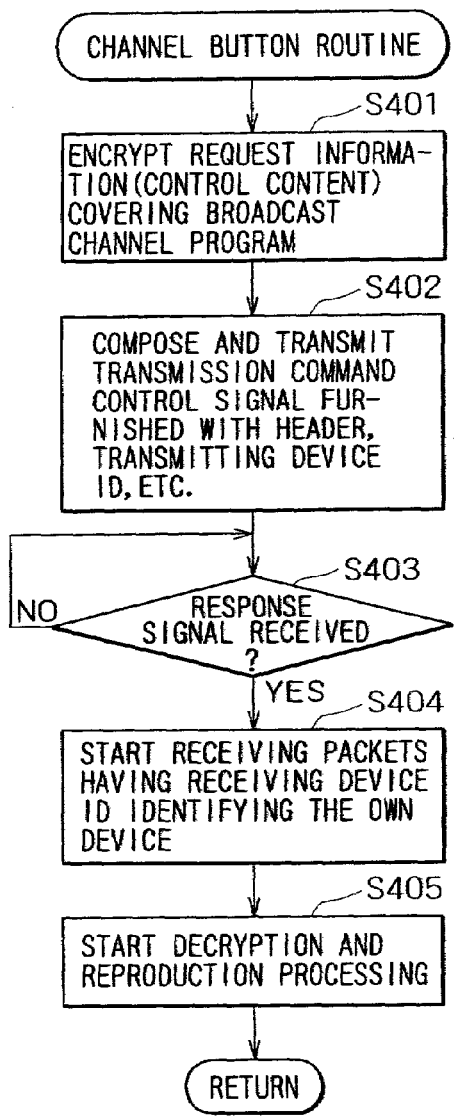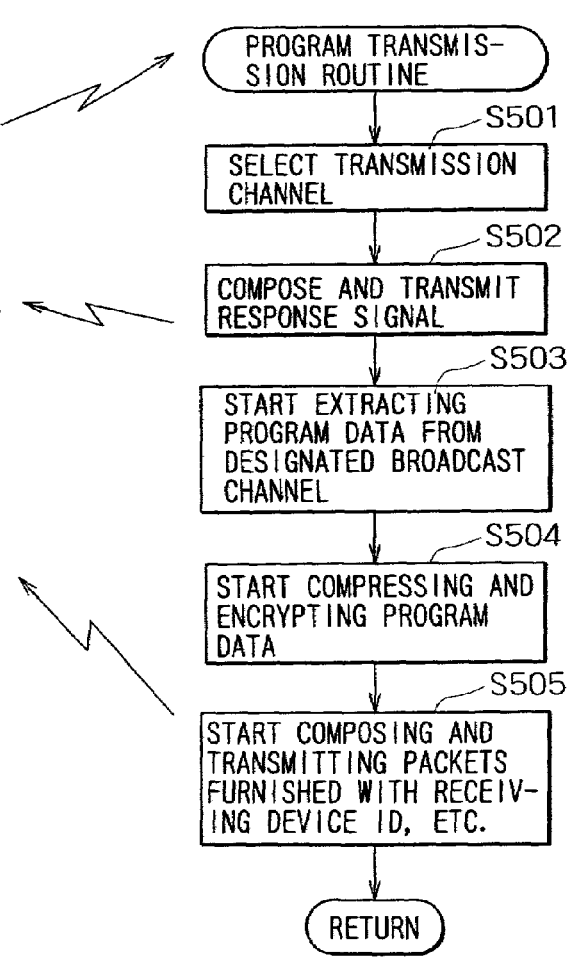
FIG. 12A CLIENT-SIDE PROCESSING
FIG. 12B SERVER-SIDE PROCESSING

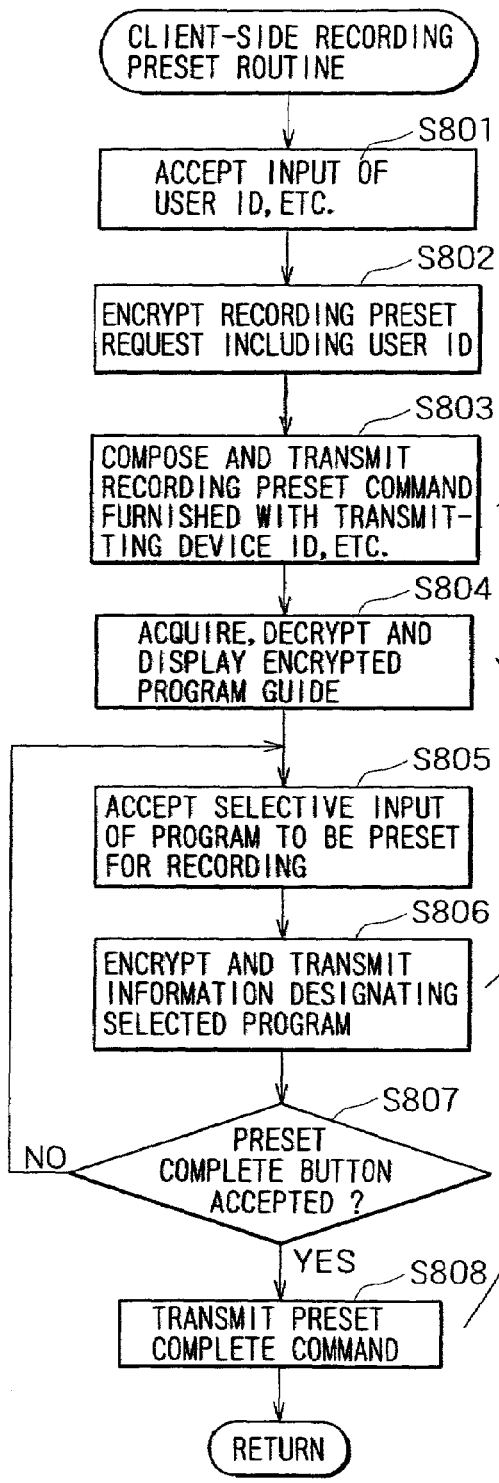

FIG. 15

| USER ID | RESTRICTIONS | DESCRIPTION |
|---|---|---|
| 001 | FREE | NO RESTRICTIONS |
| 002 | X (FOR ADULTS ONLY) | ADULTS-ONLY (X-RATED) PROGRAMS ARE UNAVAILABLE |
| 003 | X (FOR ADULTS ONLY) | ADULTS-ONLY (X-RATED) PROGRAM ARE UNAVAILABLE |
|  | R (UNFIT FOR CHILDREN UNDER 16) | PROGRAMS RATED AS UNFIT FOR CHILDREN UNDER 16 (R-RATED) ARE UNAVAILABLE |
| ⋮ | ⋮ |  |

FIG. 16

| SEQ-No | PRESETTING DEVICE ID | USER ID | START TIME | END TIME | CH | MONITOR CLASSIFICATION | |
|---|---|---|---|---|---|---|---|
| | | | | | | USER | DEVICE |
| 1 | 01 | 003 | 11:00, 8/25/2000 | 12:00, 8/25/2000 | 5 | 1 | 1 |
| 2 | 02 | 003 | 11:30, 8/25/2000 | 13:30, 8/25/2000 | 8 | 1 | 0 |
| 3 | 01 | 002 | 11:00, 8/25/2000 | 12:00, 8/25/2000 | 7 | 0 | 1 |
| ...... | ...... | ...... | ...... | ...... | ...... | ...... | ...... |

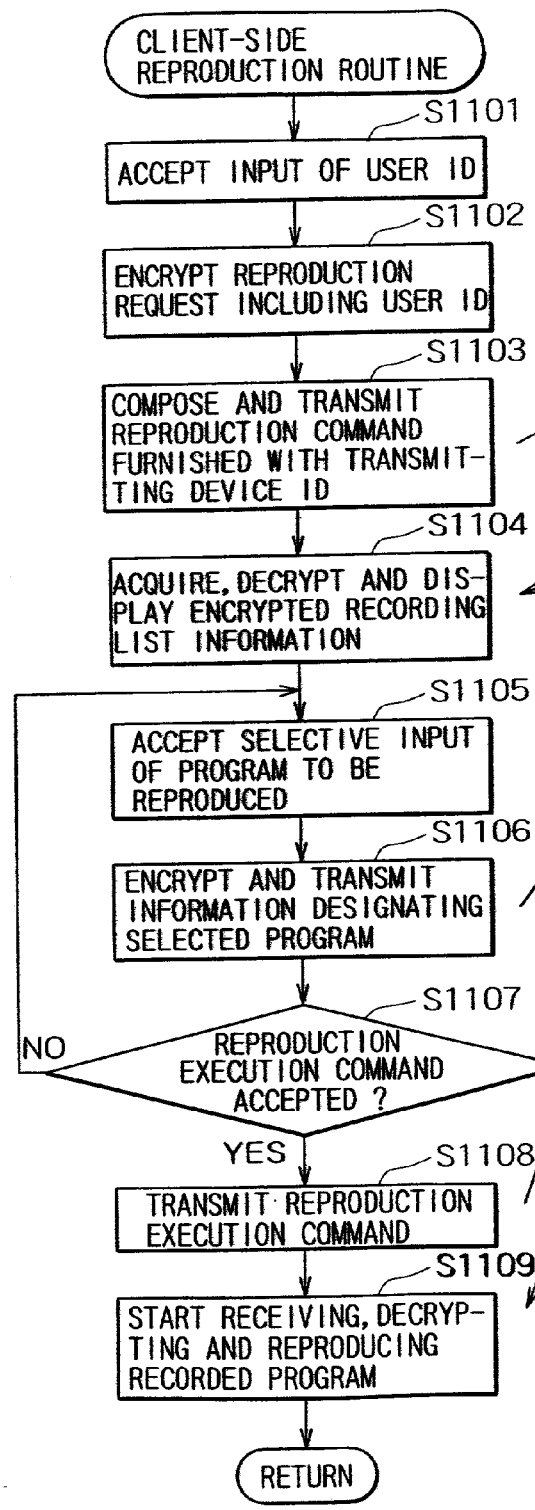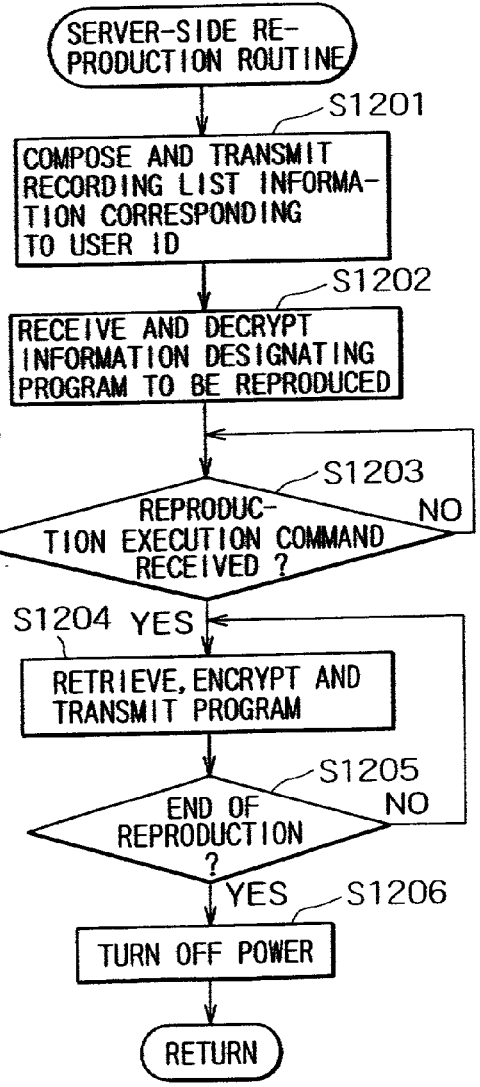

FIG. 20

| | ON DEVICE A SIDE | ON DEVICE B SIDE |
|---|---|---|
| PRIVATE KEY | $X\_A$ | $X\_B$ |
| PUBLIC KEY | $Y\_A = g \wedge (X\_A) \bmod p$ | $Y\_B = g \wedge (X\_B) \bmod p$ |
| TEMPORARY KEY | $K = Y\_B \wedge (X\_A) \bmod p$ $= g \wedge (X\_A \cdot X\_B) \bmod p$ | $K = Y\_A \wedge (X\_B) \bmod p$ $= g \wedge (X\_B \cdot X\_A) \bmod p$ |

WIRELESS DATA TRANSMITTING AND RECEIVING SYSTEM, SERVER DEVICE, AND SERVER DEVICE CONTROLLING METHOD

BACKGROUND OF THE INVENTION

The present invention relates to a wireless data transmitting and receiving system, a server device and a server device controlling method, the system having the server device wirelessly connected to a plurality of wirelessly networked clients, the server device wirelessly supplying the clients with externally acquired reproduced data as requested by the clients.

Recent years have seen the development and implementation of digital satellite broadcasting in addition to conventional analog terrestrial TV broadcasts and analog satellite broadcasts using broadcasting and communication satellites. In a digital satellite broadcast, a single broadcast wave typically has data representative of numerous programs multiplexed therein on a time division basis. In other words, one broadcast wave is used to broadcast concurrently a large number of programs.

To receive and enjoy any of the programs offered by digital satellite broadcasting involves the use of a digital satellite broadcast receiver such as IRD (integrated receiver/decoder). When a broadcast wave from a target satellite is received, EPG (electronic programming guide) information contained in the wave is referenced and a desired broadcast program is selected accordingly for enjoyment.

When a single broadcast wave offers many programs simultaneously, there will be a growing number of cases in which family members of each household may wish to view different programs individually. The situation requires that broadcast programs be watched not only in the family's shared space such as the living room but also in individual rooms as desired.

The requirement is typically met by setting up a satellite broadcast receiver together with a monitor unit or a television set in each room, plus a VTR (video tape recorder) where necessary. The setup is designed to let the members in different rooms receive selectively the desired broadcast programs for individual enjoyment.

The setup above, however, has a number of disadvantages. Installing a plurality of satellite broadcast receivers in each household can be costly. To equip individual rooms with the satellite broadcast receiver requires leading an antenna cable into all rooms involved from a satellite broadcast receiving antenna, which can be a troublesome chore.

With a plurality of satellite broadcast receivers set up in the household, they obviously receive the same satellite broadcast signal. A user in each room operates his or her receiver to tune in selectively to a desired program. This amounts to a waste of resources, with the multiple satellite broadcast receivers receiving the same program signal that includes programs not selected by anyone. The setup can also lead to increased power consumption in the household.

These shortcomings notwithstanding, it is impossible for the receiver side (i.e., viewers side) directly to control the program transmitter side (i.e., broadcasting station side) in a manner requesting the latter to send only desired programs. Even if an individual receiver (i.e., viewer side) succeeds in requesting the transmitter side (i.e., broadcasting station side) to transmit a specific program, the transmitter side cannot possibly cope with such requests coming simultaneously from a large number of receivers.

One solution to the above problems is to build what is known as a home network system by wirelessly connecting a satellite broadcast receiver with a plurality of monitor units. In this system, the satellite broadcast receiver corresponds to a wireless server device and each monitor unit represents a wireless client device.

The advantage of getting a plurality of wireless client devices (i.e., monitor units) to share a single wireless server (satellite broadcast receiver) is apparently twofold: a single receiver replacing the conventionally required multiple receivers, and the absence of antenna cables snaking from one room to the next. The solution is supposed to make it easier to enjoy TV programs anywhere in the household.

The advantage above may well be offset by a number of deficiencies. Wireless transmission of broadcast programs from a satellite broadcast receiver in a given household to its monitor sets can spill out to and be tapped by monitor units in neighboring households.

Since many digital satellite broadcast channels are chargeable, receiving spillover transmissions from a satellite broadcast receiver next door is equivalent to piracy. With due fees for the reception left unpaid, copyright holders' interests are infringed on. From the viewpoint of family members in possession of the satellite broadcast receiver, their privacy is violated when their preferences in the selection of broadcast programs become known to their neighbors.

In addition to the problem of potential encroachment on the family' privacy by its neighbors, individual family members' privacy can also be violated by other members within the same home network system if it is easy for any one member in one room to know the program any other member is watching in another room. It is preferable that each family member's privacy be protected as well even within the same home network.

Furthermore, installing a home network system, it should be noted, satisfies users only if the system is appreciably easier to operate and consumes much less power than the conventional setup where a plurality of satellite broadcast receivers are connected to monitor units and/or VTRs.

SUMMARY OF THE INVENTION

In solving the foregoing and other problems of the related art and according to one aspect of the invention, there is provided a wireless data transmitting and receiving system having a server device connected wirelessly to a plurality of client devices constituting a wireless network, the system transmitting and receiving data in packets on a time division basis between the server device and the plurality of client devices over the wireless network; wherein each of the client devices includes: a wireless communicating element for wirelessly transmitting and receiving data to and from the server device; an identification data storing element for storing device identification data unique to each of the wireless devices connected wirelessly to the wireless network; a packet evaluating element for evaluating the packets received by the wireless communicating element so as to extract from the received packets only those packets addressed to the own device based on the device identification data stored in the identification data storing element; an encryption key storing element for storing an encryption key shared only by the devices connected to the wireless network, the encryption key being used to encrypt and decrypt the data communicated over the wireless network; a decrypting element for decrypting the encrypted data transmitted in the packets that were received and extracted, the decryption being done by use of the encryption key stored in the encryption key storing element; a reproducing element for reproducing the data decrypted by the decrypting element; an operating element for inputting a command requesting the server device to transmit the data to be reproduced by the reproducing element; an encrypting element for encrypting control data to be transmitted to the server device, the encryption being done by use of the encryption key stored in the encryption key storing element; a packet composing element for composing the control data encrypted by the encrypting element into packets each furnished with the device identification data stored in the identification data storing element and with receiving device identification data designating the server device as the device to receive the control data; and a controlling element which, based on the command for controlling the server device, controls the encrypting element, the packet composing element and the wireless communicating element in such a manner causing the wireless communicating element to transmit the packets for controlling the server device by way of the wireless communicating element; and wherein the server device includes: a wireless communicating element for wirelessly transmitting and receiving data in packets to and from the client devices over the wireless network; an identification data storing element for storing first device identification data unique to each of the wireless devices connected wirelessly to the wireless network; a packet evaluating element for evaluating the packets received by the wireless communicating element so as to extract from the received packets only those packets addressed to the own device based on the device identification data stored in the identification data storing element; an identification data holding element for holding second device identification data for identifying the device that transmitted the extracted packets; an encryption key storing element for storing the encryption key shared only by the devices connected to the wireless network, the encryption key being used to encrypt and decrypt the data communicated over the wireless network; a decrypting element for decrypting the encrypted control data transmitted in the packets that were received and extracted, the decryption being done by use of the encryption key stored in the encryption key storing element; an inputting element for inputting data destined for reproduction by the client devices; a compressing element for compressing the reproduction-destined input data; an encrypting element for encrypting the compressed reproduction-destined data based on the encryption key stored in the encryption key storing element; a packet composing element for composing the encrypted reproduction-destined data into packets each furnished with the device identification data stored in the identification data storing element and with device identification data designating the wireless device receiving the encrypted reproduction-destined data; and a controlling element which, based on the control data extracted by the packet evaluating element and decrypted by the decrypting element, causes the inputting element to input the reproduction-destined data as designated by the control data; causes the encrypting element to encrypt the reproduction-destined input data by use of the encryption key stored in the encryption key storing element; causes the packet composing element to compose packets to be transmitted, each of the composed packets being constituted by the encrypted reproduction-destined data, by the second device identification data which are held in the identification data holding element and which identify the device having transmitted the control data, and by the first device identification data which are held in the identification data storing element and which identify the device transmitting the encrypted reproduction-destined data; and causes the wireless communicating element to transmit the composed packets over the wireless network.

According to another aspect of the invention, there is provided a server device connected wirelessly to a plurality of client devices constituting a wireless network, the server device transmitting and receiving data in packets to and from the wirelessly connected client devices on a time division basis over the wireless network, wherein each of the client devices transmits packets each constituted by control data used by the client device in question to request the server device to transmit data destined for reproduction and by unique identification data identifying the requesting client device, the requesting client device further selecting from the received packets those packets addressed to the device in question and extracting from the selected packets the data destined for reproduction, the server device including: a wireless communicating element for wirelessly transmitting and receiving data in packets to and from the wirelessly connected client devices over the wireless network; an identification data storing element for storing first device identification data unique to each of the wireless devices connected wirelessly to the wireless network; a packet evaluating element for evaluating the packets received by the wireless communicating element so as to extract from the received packets only those packets addressed to the own device based on the device identification data stored in the identification data storing element; an identification data holding element for holding second device identification data for identifying the device that transmitted the extracted packets; an encryption key storing element for storing an encryption key shared only by the devices connected to the wireless network, the encryption key being used to encrypt and decrypt the data communicated over the wireless network; a decrypting element for decrypting encrypted control data transmitted in the packets that were received and extracted, the decryption being done by use of the encryption key stored in the encryption key storing element; an inputting element for inputting data destined for reproduction by the client devices; a compressing element for compressing the reproduction-destined input data; an encrypting element for encrypting the compressed reproduction-destined data based on the encryption key stored in the encryption key storing element; a packet composing element for composing the encrypted reproduction-destined data into packets each furnished with the device identification data stored in the identification data storing element and with device identification data designating the wireless device receiving the encrypted reproduction-destined data; and a controlling element which, based on the control data extracted by the packet evaluating element and decrypted by the decrypting element, causes the inputting element to input the reproduction-destined data as designated by the control data; causes the encrypting element to encrypt the reproduction-destined input data by use of the encryption key stored in the encryption key storing element; causes the packet composing element to compose packets to be transmitted, each of the composed packets being constituted by the encrypted reproduction-destined data, by the second device identification data which are held in the identification data holding element and which identify the device having transmitted the control data, and by the first device identification data which are held in the identification data storing element and which identify the device transmitting the encrypted reproduction-destined data; and causes the wireless communicating element to transmit the composed packets over the wireless network.

According to a further aspect of the invention, there is provided a server device controlling method for controlling a server device connected wirelessly to a plurality of client devices constituting a wireless network, the server device wirelessly transmitting and receiving data in packets to and from the client devices on a time division basis over the wireless network, wherein each of the client devices transmits packets each constituted by control data used by the client device in question to request the server device to transmit data destined for reproduction and by unique identification data identifying the requesting client device, the requesting client device further selecting from the received packets those packets addressed to the device in question and extracting from the selected packets the reproduction-destined data, the server device controlling method including the steps of: causing the server device to receive data in packets from the wirelessly connected client devices over the wireless network; extracting from the received packets only those packets addressed to the own device based on first device identification data included in each packet and unique to each of the devices connected wirelessly to the wireless network; separating from the extracted packets second device identification data for identifying the device that transmitted the extracted packets, the separated second device identification data being retained; decrypting encrypted control data transmitted in the packets that were received and extracted, the decryption being done by use of an encryption key shared only by the devices connected to the wireless network upon encrypting and decrypting data communicated over the wireless network; extracting data to be transmitted to the requesting client device out of reproduction-destined input data based on the decrypted control data, the extracted data being input selectively; compressing the reproduction-destined data selectively input; encrypting the compressed reproduction-destined data based on the encryption key; composing packets each constituted by the encrypted reproduction-destined data, by the first device identification data, and by the second device identification data retained; and transmitting the packets thus composed over the wireless network.

Other objects, features and advantages of the invention will become more apparent upon a reading of the following description and appended drawings.

BRIEF DESCRIPTION OF THE DRAWINGS

FIG. 6 is a tabular view explaining how copyrights and user privacy are protected by use of encryption and device ID arrangements;

FIG. 7 is a schematic view indicating a typical sequence of wireless communication between wireless client devices and a wireless server device;

FIGS. 8A, 8B and 8C are schematic views explaining transmission channels used by the wireless communication system of FIG. 1;

FIG. 9 is a flowchart of steps carried out by the wireless server device 1 upon power-up;

FIG. 10 is a flowchart of steps constituting a main routine performed by the wireless client devices 2 and 3;

FIG. 11 is a flowchart of steps constituting a main routine carried out by the wireless server device 1;

FIGS. 12A and 12B are flowcharts of steps performed by the wireless server device and wireless client devices for wirelessly transmitting and receiving main data therebetween;

FIGS. 14A and 14B are flowcharts of steps performed by the wireless server device and wireless client devices for presetting program recordings;

FIG. 15 is an explanatory view of a restriction table created in advance in an EEPROM 104 of the wireless server device 1;

FIG. 16 is an explanatory view of a recording preset table created in the EEPROM 104 of the wireless server device 1;

FIGS. 18A and 18B are flowcharts of steps performed by the wireless server device and wireless client devices for reproducing recordings;

FIG. 20 is a tabular view further explaining how a public key is set for each of interconnected devices based on a public key cryptosystem.

DETAILED DESCRIPTION OF THE PREFERRED EMBODIMENTS

Preferred embodiments of this invention will now be described with reference to the accompanying drawings. The invention is embodied illustratively in the form of a wireless communication system, wireless client devices, a wireless server device, and a wireless communication method, all applicable to a home network system set up in a household.

[Overview of the Wireless Communication System]

Figure 1:
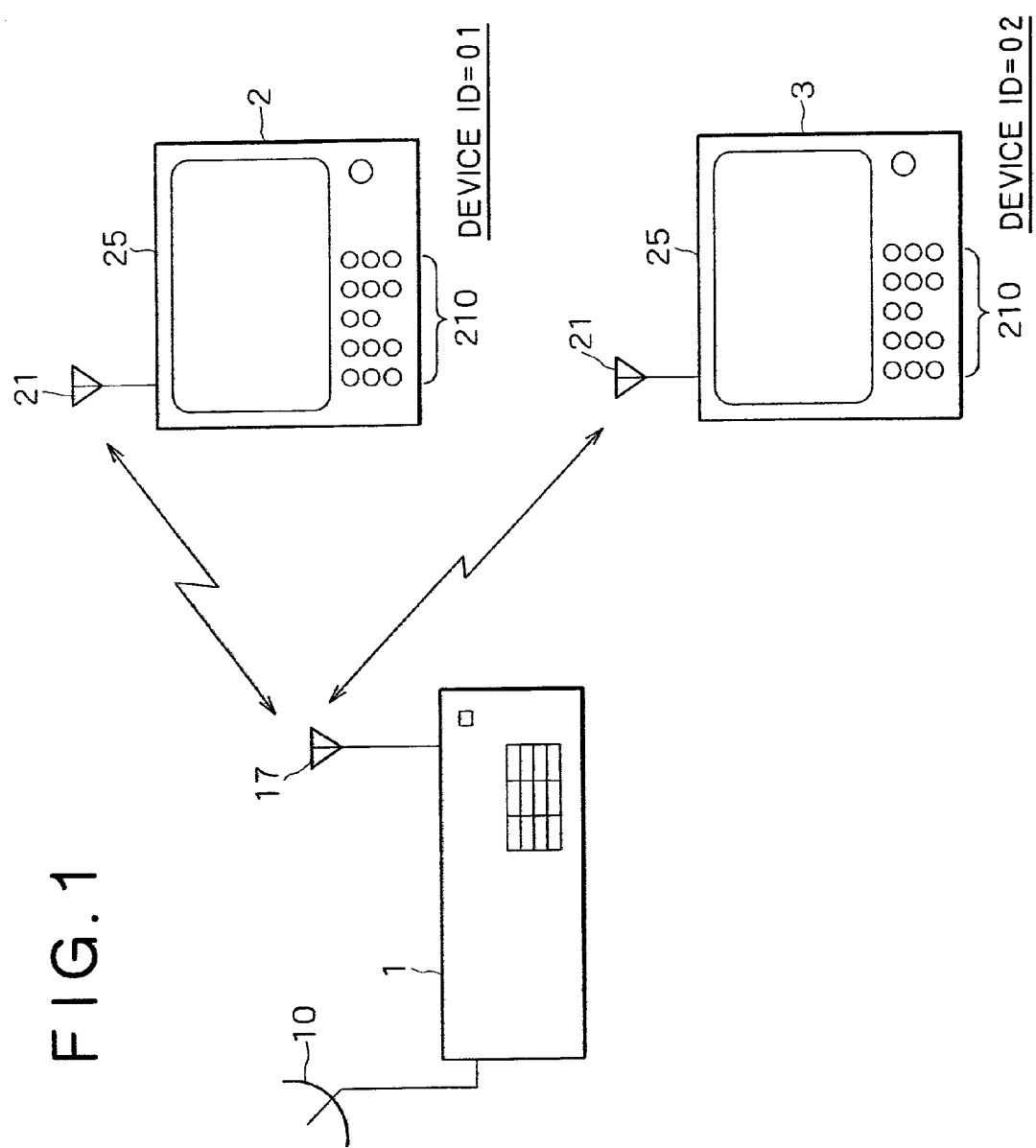
FIG. 1 is a schematic view of a wireless communication system embodying the invention.

FIG. 1 is a schematic view explaining a typical wireless communication system to which the wireless communication system, wireless client devices, wireless server device, and wireless communication method of the invention apply. The wireless communication system shown in FIG. 1 constitutes what is known as a home network system made up of a wireless server device 1 and wireless client devices 2 and 3.

Control signals and request signals are exchanged wirelessly between the wireless server device 1 and the wireless client devices 2 and 3. The wireless server device 1 transmits program data representing broadcast programs to the wireless client devices 2 and 3. In return, the wireless client devices 2 and 3 receive and reproduce the program data for enjoyment by users.

The wireless server device 1 has capabilities of receiving a digital satellite broadcast signal via a receiving antenna 10 for receiving satellite broadcasts. From the data constituting numerous broadcast programs multiplexed in the digital satellite broadcast signal, the wireless server device 1 extracts those data making up a specific broadcast program requested by the user of the wireless client device 2 or 3. The wireless server device 1 then decompresses the extracted program data such as video and audio data that have been typically compressed, and wirelessly transmits the decompressed data to the requesting client device 2 or 3 via a transceiver antenna 17.

The wireless client devices 2 and 3 are substantially the same in structure. Each client device may generate a request signal for the wireless server device 1 and transmit the signal to the server device 1 via the transceiver antenna 21, and may receive signals from the wireless server device 1 via the antenna 21.

When signals sent from the wireless server device 1 are data making up a TV broadcast program, the wireless client device 2 and 3 receives and decrypts the signals, displaying images of the broadcast program on an LCD 25 while outputting audio of the program from speakers 26, to be described later.

With this embodiment, as shown in FIG. 1, unique device identification information (device ID) is assigned to each of the configured devices. Illustratively, a device ID number "00" is assigned to the wireless server device 1, "01" to the wireless client device 2, and "02" to the wireless client device 3. The device ID corresponds to what is known as a device address that is used to identify a request signal transmitting device or a signal receiving device.

Using the device ID information, the wireless communication system of FIG. 1 precisely manages a signal transmitting device and a signal receiving device whose roles are assumed by turns by the wireless server device 1 and wireless client device 2, or wireless client device 3. The scheme ensures a one-to-one correspondence between the wireless server device 1 transmitting data on the one hand and the wireless client device 2 or 3 receiving the data on the other hand.

In the wireless communication system of this embodiment, the wireless server device 1 may transmit main information signals such as program data as well as request information, and the wireless client devices 2 and 3 may for their part transmit their own request information. In such cases, the information to be transmitted is encrypted by use of a public key cryptosystem. This protects in a secure manner the information from getting received by, say, wireless client devices set up in neighboring households, i.e., client devices not belonging to the wireless communication system of FIG. 1.

The public key cryptosystem involves having a common encryption key, so-called public key, shared by both the encrypting side and the decrypting side in encrypting and decrypting data.

[Wireless Server Device 1]

Figure 2:
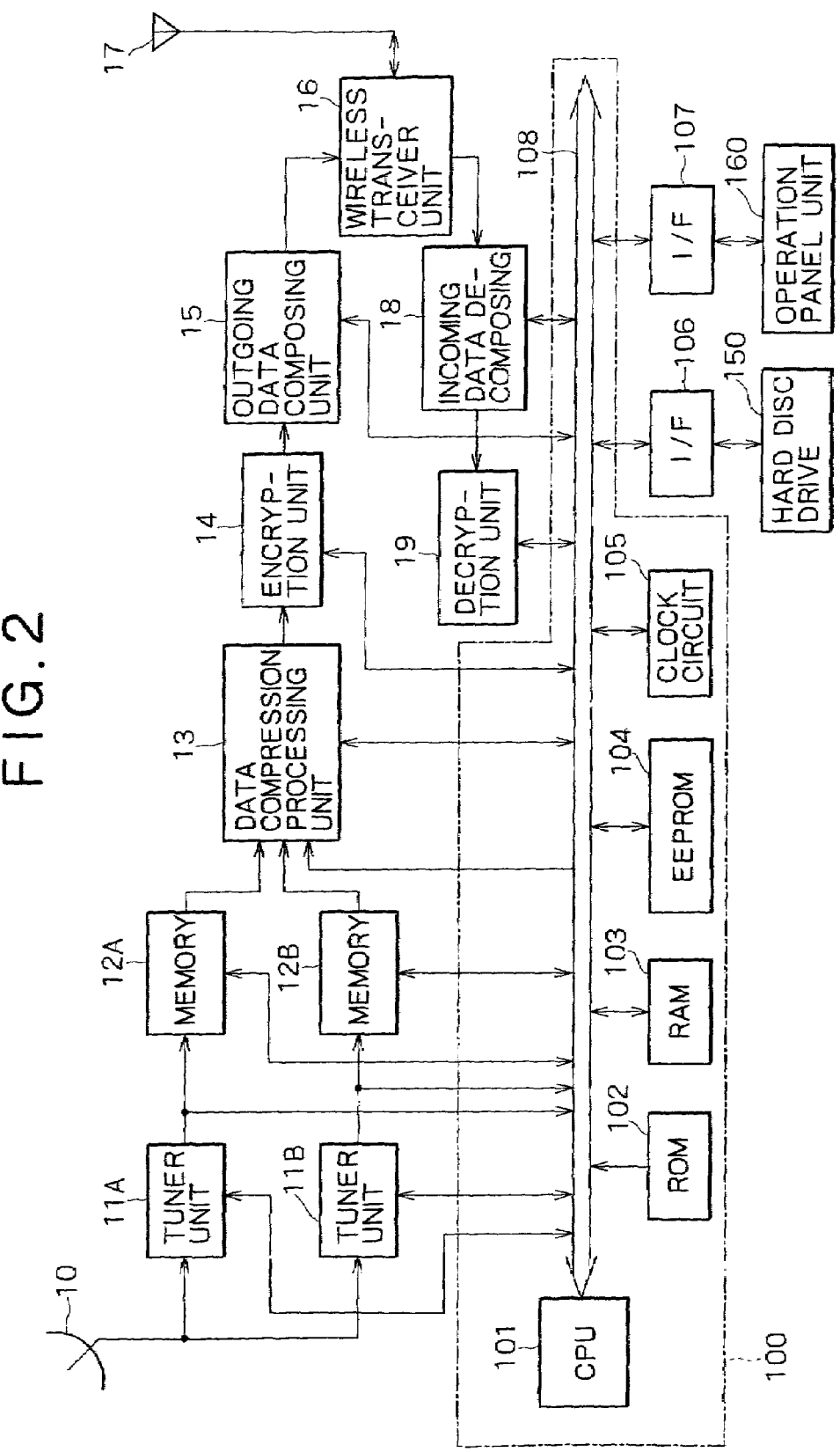
FIG. 2 is a block diagram of a wireless server device embodying the invention.

Typical structures of the wireless server device 1, wireless client device 2 and wireless client device 3 of this embodiment are described below. The wireless server device 1 will be discussed first. FIG. 2 is an explanatory block diagram of the wireless server device 1. This server device 1 has capabilities of receiving digital satellite broadcasts and of communicating wirelessly with the wireless client devices 2 or 3, as will be described later in more detail.

The wireless server device 1 in FIG. 2 comprises digital satellite broadcast tuner units 11A and 11B, memories 12A and 12B, a data compression processing unit 13, an encryption unit 14, an outgoing data composing unit 15, a wireless transceiver unit 16, a transceiver antenna 17, an incoming data decomposing unit, a decryption unit 19, a control unit 100, a hard disk drive 150, an operation panel unit 160, and interfaces 106 and 107.

The hard disk drive 150 is a mass storage device illustratively having a storage capacity of dozens of gigabytes, and is used to record broadcast programs that are received selectively, as will be described later. The operation panel unit 160 has channel selection keys and function keys to be operated by a user, and is designed to accept user-operated key entries. The hard disk drive 150 and the operation panel unit 160 are connected to the control unit 100 via the interfaces 106 and 107 respectively.

The control unit 100 controls various circuits in the wireless server device 1 and serves to generate control information such as requests to be transmitted to the wireless client devices. In the wireless server device 1 of this embodiment, as shown in FIG. 2, the control unit 100 is a microcomputer-based controller having a CPU 101, a ROM 102, a RAM 103, an EEPROM 104, and a clock circuit 105, all interconnected by a CPU bus 108.

The CPU stands for a central processing unit, ROM for a Read Only Memory, RAM for a Random Access Memory, and EEPROM for an Electrically Erasable and Programmable ROM.

The ROM 102 in the control unit 100 retains in advance processing programs for execution by the control unit 100, as well as data needed for such processing. The RAM 103 serves primarily as a work area used by the control unit 100 in carrying out various processes.

The EEPROM 104 is a nonvolatile memory designed to retain various parameters and program recording preset information even after the wireless server device 1 is switched off. The clock circuit 105 has a so-called calendar function capable of issuing the time of day, day of the week, and day of the month information.

In the wireless server device 1 of this embodiment, as shown in FIG. 1, the tuner facility is composed of the tuner units 11A and 11B set up in parallel, and the memory facility is made up of the memories 12A and 12B also arranged in parallel. The parallel setup is intended to deal with requests from the two wireless client devices 2 and 3 receiving two broadcast programs offered concurrently by the same digital satellite broadcast.

[Signal Transmission from the Wireless Server Device 1]

The digital satellite broadcast signal received by the antenna 10 set up outdoors is fed to the tuner units 11A and 11B. The tuner units 11A and 11B demodulate the digital satellite broadcast signal and, based on a selection control signal from the control unit 100, extracts program data constituting designated broadcast programs from those programs multiplexed in the demodulated satellite signal. The tuner units 11A and 11B decompress the extracted program data and supply the decompressed original program data to the memories 12A and 12B respectively.

For this embodiment, it is assumed that the digital satellite broadcast received by the wireless server device 1 is scrambled and thus chargeable. Given a scramble key from the control unit 100, the tuner units 11A and 11B descramble the received broadcast previously scrambled.

The scramble key is offered only to those subscribers who have paid for the broadcast reception. Although not shown, each digital satellite broadcasting station has a conditional access center (CA center) that manages charges on the subscribers of the station. The conditional access center supplies the subscribers with necessary scramble keys in a suitably timed manner. Such charge-related processing is dealt with by the wireless server device 1 using illustratively a modem and a TA (terminal adapter), not shown.

The memories 12A and 12B are used as buffers that temporarily accommodate digital program data from the tuner units 11A and 11B. In response to requests from the data compression processing unit 13, the memories 12A and 12B feed the program data to that unit 13.

The data compression processing unit 13 compresses the program data from the memories 12A and 12B by a predetermined data compression method. More specifically, the data compression processing unit 13 distinguishes the program data from the memory 12A from those coming from the memory 12B and compresses the respective data groups separately. The program data compressed by the data compression processing unit 13 are sent to the encryption unit 14.

As mentioned above, the encryption unit 14 operates by the public key cryptosystem. A public key for encryption and decryption is shared by the wireless server device 1 transmitting signals and by the wireless client devices 2 and 3 receiving signals from the server. Using the public key, the encryption unit 14 encrypts the compressed program data and forwards the encrypted data to the outgoing data composing unit 15.

In response to control signals from the control unit 100, the outgoing data composing unit 15 composes outgoing packets which include the encrypted program data from the encryption unit 14 and which constitute signals to be transmitted in a predetermined format. The data to be transmitted here in packets are program data, i.e., main data constituted by the broadcast program.

Figure 4:
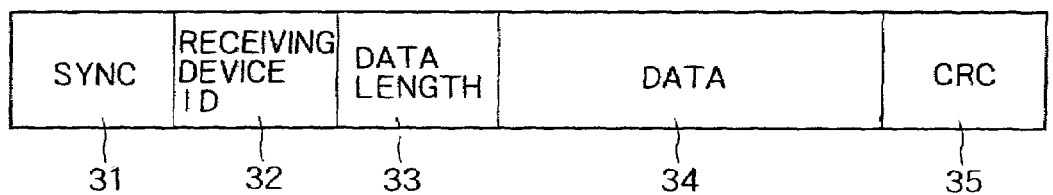
FIG. 4 is an explanatory view showing a typical layout of a packet in which to transmit main data such as program data within the wireless communication system of FIG. 1.

On transmitting the main data, the outgoing data composing unit 15 in the wireless server device 1 of this embodiment composes outgoing packets whose layout is shown in FIG. 4. FIG. 4 is an explanatory view showing a typical layout of a packet composed by the outgoing data composing unit 15 transmitting the main data constituting program data.

As shown in FIG. 4, each packet in which to transmit the main data comprises a synchronizing signal area 31 (indicated as SYNC in the figure), a receiving device ID area 32, a data length area 33, a main data area 34, and an error code area 34.

The synchronizing signal area 31 contains a synchronizing signal that allows the receiving side to synchronize continuously transmitted packets accommodating the main data. The receiving device ID area 32 contains a receiving device ID designating the wireless client device that should receive the main data packets. In other words, the wireless client device receiving the main data packets is specified by the receiving device ID described in the receiving device ID area 32.

The data length area 33 holds data length information indicating the data length in the outgoing packets carrying the main data shown in FIG. 4. The main data area 34, as mentioned above, accommodates the main data compressed and encrypted to constitute the program data. With this embodiment, a CRC (cyclic redundancy check) code used as an error code is contained in the CRC area 35.

The main data-carrying packets, laid out as shown in FIG. 4 to transmit the main data, are modulated by a predetermined method and transmitted via the wireless transceiver unit 16 and transceiver antenna 17. The wireless server device 1 is capable of receiving request signals from the wireless client devices 2 and 3. The wireless transceiver unit 16 processes wirelessly exchanged signals in such a manner that outgoing signals will not affect incoming signals.

The data constituting the selected broadcast program are compressed, encrypted and packetized. The data in packets are assigned by a receiving device ID and are transmitted to the requesting wireless client device identified by that ID.

It is assumed that the data compression processing unit 13, encryption unit 14, and outgoing data composing unit 15 are capable of high-speed processing. This makes it possible to process parallelly the program data from the tuner unit 11A and those from the tuner unit 11B.

The arrangement above is not limitative of the invention. Alternatively, each of the data compression processing unit 13, encryption unit 14, and outgoing data composing unit 15 may be constituted by two parallelly established units. In such a case, one stream of units may deal with the program data from the tuner unit 11A and the other stream of units may address the program data from the tuner unit 11B.

[Signal Reception by the Wireless Server Device 1]

The wireless server device 1 of this embodiment is designed to receive request signals from the wireless client devices 2 and 3 and to carry out processes in accordance with the received requests. More specifically, request signals from the wireless client devices 2 and 3 are first captured by the transceiver antenna 17 and then fed to the incoming data decomposing unit 18 through the wireless transceiver unit 16.

Figure 5:
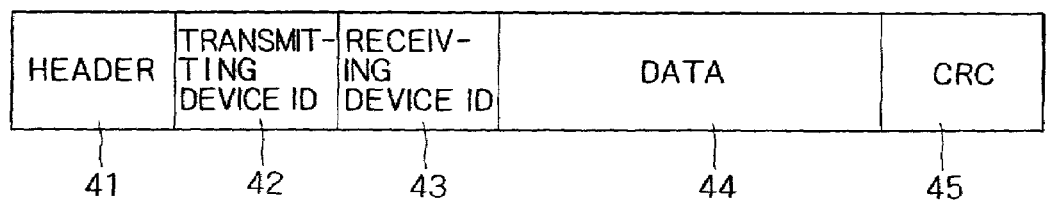
FIG. 5 is an explanatory view depicting a typical layout of a packet in which to transmit control signals such as a request signal within the wireless communication system of FIG. 1.

With this embodiment, the request signals constituting request data from the wireless client devices 2 and 3 are also transmitted in packets each laid out in a predetermined manner. FIG. 5 is an explanatory view depicting a typical layout of a packet in which the wireless client device 2 or 3 transmits a request signal.

As shown in FIG. 5, the packet in which to transmit the request signal is made up of a header area 41, a transmitting device ID area 42, a receiving device ID area 43, a data area 44, and an error code area 45. The header area 41 contains information indicating that the packet in question carries the request signal. The transmitting device ID area 42 retains a device ID designating the device that transmits this packet.

The receiving device ID area 43 contains a device ID specifying the device that receives this packet. The data area 44 accommodates specific request information such as a command requesting the supply of a desired broadcast program, a channel number corresponding to the desired program, or recording preset information. With this embodiment, request information from the wireless client devices is encrypted before being output, as will be described later. The error code area 44 contains a CRC code for this embodiment.

The incoming data decomposing unit 18 in the wireless server device 1 analyzes and decomposes request signals sent from the wireless client device 2 or 3 in packets whose layout is shown in FIG. 5. Given the packet, the unit 18 extracts the request information from the data area 44 of the packet and feeds the extracted information to the decryption unit 19. The remaining data are sent illustratively to the control unit 100. In turn, the control unit 100 recognizes the data as representative of a request signal, identifies the transmitting client device indicated by the data, and checks the CRC code to see whether the packet has been correctly transmitted.

Using the public key in the decrypted request information, the decryption unit 19 decrypts the encrypted request information and forwards the decrypted request information to the control unit 100. The control unit 100 controls various parts as requested by the request information received. Illustratively, if the request information is found to request the supply of a broadcast program as mentioned above, then the control unit 100 generates accordingly a selection control signal such as to extract the data constituting the target program broadcast over the appropriate channel. The control signal thus generated is used to control the tuner unit 11A or 11B.

If the request information is found to constitute the presetting of a desired broadcast program, then the control unit 100 records to the EEPROM 104 such information as the broadcast start and end times of the program to be recorded and the channel over which the program of interest is broadcasted. When the broadcast start time is reached, the tuner unit 11A or 11B is activated to extract the preset program from the broadcast and to record the extracted program to the hard disc drive 150 through the control unit 100 and interface 106.

If the request information is found to constitute a command requesting a broadcast signal to be reproduced from the hard disc drive 150 via the interfaces 106, then the control unit 100 reads the data making up the target broadcast program from the hard disc drive 150 and supplies the retrieved data to the data compression processing unit 13.

The program data read from the hard disc drive 150 are compressed by the data compression processing unit 13, encrypted by the encryption unit 14, and packetized by the outgoing data composing unit 15. The data in packets are transmitted to the requesting client device via the wireless transceiver unit 16 and transceiver antenna 17. The packetized data, when received by the requesting client device, are reproduced thereby.

In response to the user's input through the operation panel unit 160, the wireless server device 1 of this embodiment may compose a request signal accordingly and send the signal to the wireless client device 2 or 3.

Illustratively, the wireless server device 1 is operated to turn on or off the wireless client devices 2 and 3. More specifically, the user may manipulate operation keys on the operation panel unit 160 to enter a command for switching on the wireless client device 2. In that case, the control unit 100 composes request information reflecting the user's command and feeds the information to the encryption unit 14.

In turn, the encryption unit 14 encrypts the request information destined for the wireless client device 2. The encryption involves forming a request signal including a header, a receiving device ID designating the wireless client device 2 as the device to receive the signal, and an error code, as depicted in FIG. 5. The request signal thus formed is transmitted to the wireless client device 2 via the wireless transceiver unit 16 and transceiver antenna 17.

As described, the wireless server device 1 of this embodiment is capable of receiving digital satellite broadcast signals and, when requested by the wireless clients 2 and 3, extracts desired broadcast programs from the received broadcast signals. The wireless server device 1 encrypts the extracted program before wirelessly transmitting the encrypted data to the requesting wireless client device. The wireless server device also allows broadcast programs to be preset for unattended recording and permits recorded programs to be reproduced in response to requests from the wireless client device.

As described above, the wireless server device 1, given the user's command input, may transmit request signals to the wireless client devices 2 and 3 for control purposes. That is, the wireless client devices 2 and 3 are each in possession of facilities constituting remote control means with regard to the wireless server device 1; on the other hand, the wireless server device 1 has facilities constituting remote control means with respect to the wireless client devices 2 and 3.

[Wireless Client Devices 2 and 3]

Figure 3:
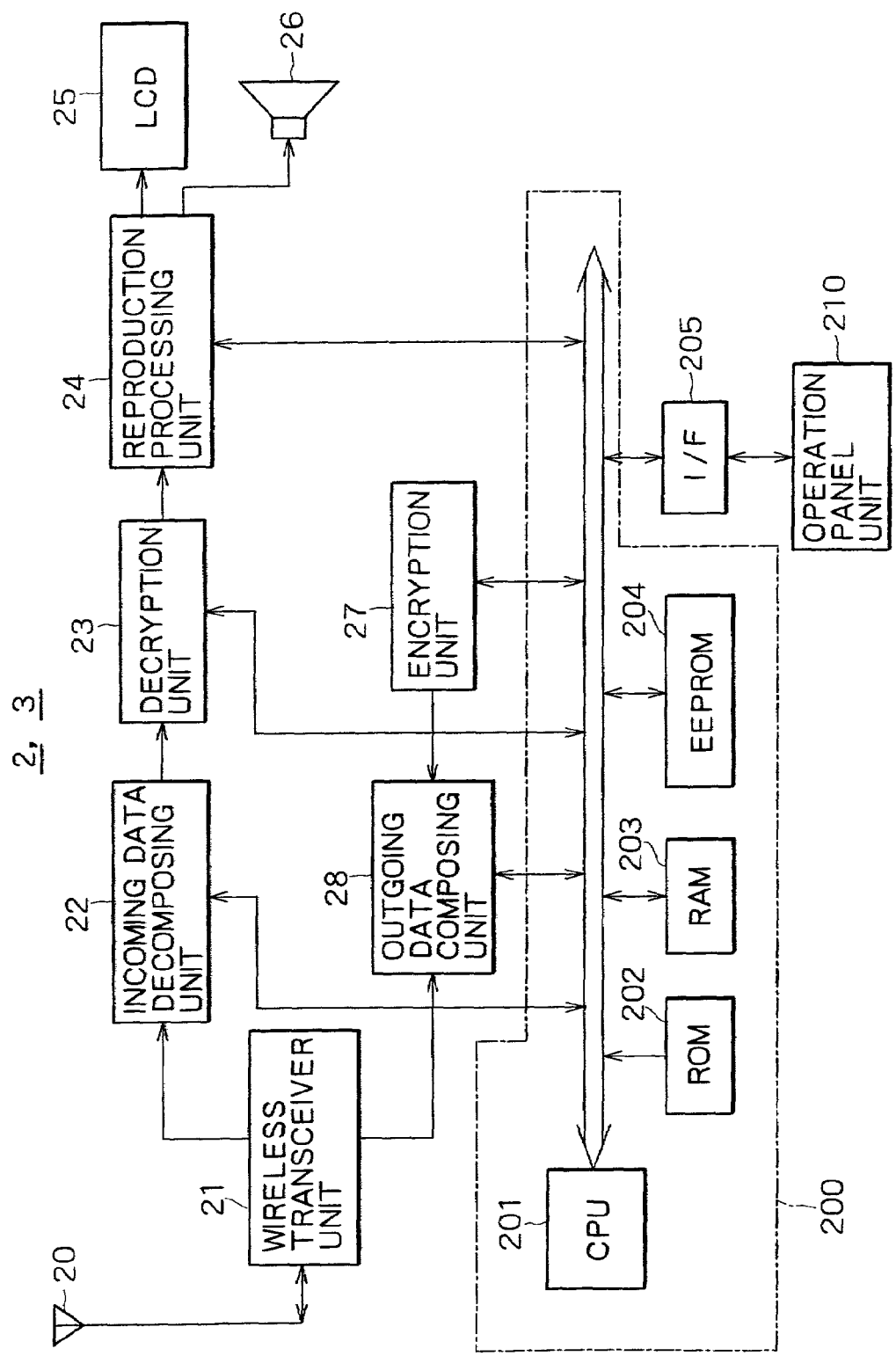
FIG. 3 is a block diagram of a wireless client device embodying the invention.

The wireless client devices 2 and 3 will now be described. FIG. 3 is a block diagram for explaining the wireless client device (device 2 or 3) of this embodiment. Although the wireless client devices 2 and 3 are assigned different device IDs as mentioned earlier, they are structurally identical. The structure shown in FIG. 3 is representative of the two wireless client devices 2 and 3.

As illustrated in FIG. 3, the wireless client devices 2 and 3 are each made up of a transceiver antenna 20, a wireless transceiver unit 21, an incoming data decomposing unit 22, a decryption unit 23, a reproduction processing unit 24, an LCD 25, speakers 26, an encryption unit 27, an outgoing data composing unit 28, a control unit 200, and an operation panel unit 210.

The operation panel unit 210 has channel selection keys and function keys to be operated by a user, and is designed to accept user-operated key entries. The operation panel unit 210 is connected to the control unit 200 via an interface 205.

The control unit 200 controls various circuits in the wireless client devices 2 and 3 and serves to generate control information such as requests to be transmitted to the wireless server device 1. In the wireless client devices 2 and 3 of this embodiment, as shown in FIG. 3, the control unit 200 is a microcomputer-based controller having a CPU 201, a ROM 202, a RAM 203, and an EEPROM 204, all interconnected by a CPU bus 206.

The ROM 202 in the control unit 200 retains in advance processing programs for execution by the control unit 200, as well as data needed for such processing. The RAM 203 serves primarily as a work area used by the control unit 200 in carrying out various processes. The EEPROM 204 is a nonvolatile memory designed to retain various parameters even after the wireless client devices 2 and 3 are switched off.

[Reception of Main Data by the Wireless Client Devices 2 and 3]

As mentioned above, packets containing the main data such as wirelessly transmitted program data from the wireless server device 1 are received via the transceiver antenna 20. The received packets are forwarded to the incoming data decomposing unit 22 through the wireless transceiver unit 21. As will be explained later, the wireless transceiver unit 21 processes wirelessly exchanged signals in such a manner that outgoing signals will not affect incoming signals.

The incoming data decomposing unit 22 decomposes the main data comprising the program data, transmitted in packets whose layout is shown in FIG. 4, into various areas of data. The incoming data decomposing unit 22 evaluates each packet to determine whether it is destined for the own device according to the receiving device ID in the packet, and to check whether any transmission error has occurred by examining the CRC data in the packet. If a given packet is judged destined for the own device and if it has been transmitted normally, the incoming data decomposing unit 22 judges the packet in question to be receivable, retrieves the main data from the packet, and feeds the retrieved main data to the decryption unit 23.

If the received packet is not judged destined for the own device, then subsequent processing will not be carried out. If a transmission error is detected and judged unrecoverable by interpolation, then the control unit 200 takes steps to request retransmission of the already transmitted signal that has been judged erroneous.

That is, the incoming data decomposing unit 22 extracts from the packets received by the wireless transceiver unit 21 only those packets evaluated as destined for the own device. Checks are thus made on the received packets to see if they are usable in subsequent processing.

Alternatively, the control unit 200 may determine whether each received packet is destined for the own device and whether it has any transmission error, on the basis of information furnished by the incoming data decomposing unit 22 decomposing each packet received.

The program data constituting the main data fed to the decryption unit 22 are decrypted thereby using the public key. The decrypted program data are supplied to the reproduction processing unit 24. The reproduction processing unit 24 decompresses the supplied program data and composes the decompressed data into an output video signal and an output audio signal for image and sound output.

The output video signal composed by the reproduction processing unit 24 is sent to the LCD 25, and the output audio signal is fed to the speakers 26. When the program data wirelessly transmitted from the wireless server device 1 are thus reproduced, the broadcast program constituted by the received data is enjoyed by the user via the wireless client device 2 or 3.

[Transmission of Request Signals from the Wireless Client Devices 2 and 3]

The wireless client devices 2 and 3 may output various request signals to the wireless server device 1. The user at a client device manipulates suitable operation keys on the operation panel unit 210 when requesting the wireless server device 1 to supply a desired broadcast program, to preset desired broadcast programs for unattended recording, or to retrieve and reproduce recorded programs from the hard disc drive 150.

The control unit 200 of the wireless client device 2 or 3 composes request information based on the manipulated operation keys and feeds the information to the encryption unit 27. In turn, the encryption unit 27 encrypts the request information from the control unit 200 and supplies the encrypted request information to the outgoing data composing unit 28.

The outgoing data composing unit 28 composes outgoing signals in packets laid out as shown in FIG. 5. Each packet accommodating the request signal to be transmitted comprises a header 41, a transmitting device ID 42, a receiving device ID 43, request information 44, and CRC 45. The request signal thus composed is wirelessly transmitted to the wireless server device 1 via the wireless transceiver unit 21 and transceiver antenna 20. Where the outgoing data composing unit 28 generates such packets to be transmitted to the wireless server device 1, the user can remotely control the wireless server device 1 by use of the wireless client device 2 or 3.

As mentioned above, the wireless server device 1 may also transmit request signals to the wireless client device 2 or 3. In such cases, the incoming data decomposing unit 22 analyzes and decomposes each received packet to extract the request information therefrom. The extracted request information is sent from the incoming data decomposing unit 22 to the decryption unit 23. The decrypted information from the decryption unit 23 is forwarded to the control unit 200.

In turn, the control unit 200 controls various circuits in response to the request information that is received by the incoming data decomposing unit 22 from the wireless server device 1 and decrypted by the decryption unit 23. The steps above allow the user remotely to control the wireless client device 2 or 3 using the wireless server device 1. Every signal transmitted by the wireless server device 1 is provided with a receiving device ID. This device ID allows each of the devices configured within the same wireless communication system to determine in a secure manner whether each received signal is destined for the own device or for all devices. That is, each configured device can handle only the signals addressed thereto including those addressed to all configured devices.

With this embodiment, the main data and request information are always encrypted before being transmitted and received. The encryption is based on the public key cryptosystem as mentioned above. The same public key is shared by the wireless server device 1 and wireless client devices 2 and 3 for encryption and decryption.

In the home network system constituted by the wireless server device 1 and wireless client devices 2 and 3 of this embodiment, each household has its own public key assigned to the devices making up the system. The public key is irrelevant to any systems in neighboring households. The key allows only the wireless server device 1 and wireless client devices 2 and 3 on the same network to exchange main data and request information therebetween.

Since not only the program data making up the main data but also the request information is encrypted before being transmitted and received, the request information will not be tapped by receivers in the neighborhood. This protects the privacy of the household in question by preventing its neighbors from knowing the household's program viewing preferences. In the unlikely event that devices having the same device ID were set up in a neighboring household, privacy is still maintained because transmitted data with CRC error requiring data retransmission are erroneously received by the neighboring wireless devices which as a result will not function properly; by the same token, the devices in the household of interest are protected from operations inadvertently initiated by erroneously received data from neighboring wireless devices.

As described, the wireless communication system of this embodiment encrypts outgoing data in order to prevent in a secure manner any receivers not part of the system such as those in the neighborhood from eavesdropping on the spill-over data. The system thus ensures protection of users' privacy as well as protection of copyright holders' legitimate rights regarding broadcast programs.

Within the wireless communication system of this embodiment, the receiving device ID identifies the device that should receive program data or request information; no other device with a different device ID can make use of the program data or request information in question. That means the inventive system securely protects the individual privacy of different users operating different devices making up the system.

FIG. 6 is a tabular view explaining how user privacy and copyrights are protected by use of encryption or device ID arrangements. In the wireless communication system of this embodiment, as shown in FIG. 1, signals sent by the wireless server device 1 can be received illustratively by the wireless client device 2 with the device ID of "01" and by the wireless client device 3 with the device ID of "02."

The wireless server device 1, wireless client device 2 and wireless client device 3 make up the wireless communication system of this embodiment. The same public key shared by these devices allows them essentially to decrypt program data or request information exchanged therebetween, as indicated by the "Encryption" row in the tabular view of FIG. 6.

Wireless client devices not belonging to the inventive wireless communication system such as those of a next door neighbor do not share the same public key and are thus incapable of decrypting or otherwise using any program data or request information transmitted by the wireless server device 1 of this embodiment.

With outgoing data from the wireless server device 1 kept unavailable to any device not part of the wireless communication system of the invention, the copyrights of the outgoing data are protected. The inventive system also protects the privacy of all family members using this wireless communication system in one household against unscrupulous parties in a neighboring household trying to eavesdrop on the spillover transmissions.

As indicated by the "Device ID" row in FIG. 6, the wireless client device 2 or 3 can only receive and utilize either transmitted signals furnished with the device ID of the device in question or transmitted signals destined for all devices. The device ID allows the program data requested by the wireless client device 2 to be supplied only to that device 2. That means the privacy of individual users within the same wireless communication system is also protected securely against one another.

A request signal sent illustratively by the wireless client device 2 may also be arranged in such a manner permitting the requested program data to be shared by other wireless client devices belonging to the same wireless communication system.

In that case, the wireless server device 1 will not furnish the program data-carrying signal with any receiving ID (such as "99") designating a specific wireless client device. Instead, the signal will be provided with a particular device ID allowing all wireless client devices of the same wireless communication system to share the signal. In that setup, all wireless client devices belonging to the same wireless communication system can receive and utilize the same signals transmitted by the wireless server device 1.

The encryption scheme protects both the copyright holders' rights on the program data transmitted by the wireless server device and the privacy of users making use of the wireless communication system of this embodiment. The scheme further protects the privacy of each user against any other user utilizing the same wireless communication system.

[Transmission Channels Between the Wireless Server Device and the Wireless Client Devices]

What follows is a description of transmission channels formed between the wireless server device 1 and the wireless client devices 2 and 3. Such channels may be formed as described below between the wireless server device 1 selectively receiving broadcast programs as requested by the wireless client device 2 or 3 on the one hand, and the requesting wireless device receiving the requested programs from the wireless server device on the other hand.

FIG. 7 is a schematic view indicating a typical sequence of wireless communication in effect when the wireless server device 1 selectively receives data constituting a broadcast program requested by the wireless client device 2 or 3 and wirelessly transmits the received program data to the requesting wireless client device.

When plugged into a commercial power outlet, the wireless server device 1 has only an essential minimum of its circuits powered and becomes ready to respond to the wireless client devices 2 and 3 joining the wireless communication network system. More specifically, the wireless server device 1 outputs a beacon signal to let the wireless client devices 2 and 3 join the wireless communication system at any time. Simultaneously, the wireless server device 1 remains ready to receive intermittently any request signals from the wireless client devices 2 and 3.

In the setup above, the wireless server device 1 scans a plurality of available frequency channels to select a channel with a minimum of noise and not used by any other communication system. With the frequency channel selected, the wireless server device 1 outputs the beacon signal allowing the client devices 2 and 3 to know that the server device is now ready to receive their request signals. In the context of this invention, the expression "the plurality of frequency channels" refers to distinctly established multiple channels over which data are modulated at different frequencies.

The wireless server device 1 is arranged to hold back on powering its parts not essential for outputting beacon signals or for receiving request signals from the wireless client devices 2 and 3. That arrangement is intended to minimize power dissipation of the wireless server device 1. In the ensuing example, the wireless client device 2 is assumed to output a request signal.

As shown in FIG. 7, the user of the wireless client device 2 initially operates channel selection button switches on the operation panel unit 210 of the device 2 to request the supply of a desired broadcast program from the wireless server device 1. In turn, the control unit 200 of the wireless client device 2 detects the operation of the channel selection button switches, composes a transmission command control signal reflecting the operated switch, i.e., a signal requesting the supply of the user-designated broadcast program, and transmits the request signal to the wireless server device 1 via the encryption unit 27, outgoing data composing unit 28, wireless transceiver unit 21, and transceiver antenna 20 (step S1 in FIG. 7).

The transmission command control signal is transmitted to the wireless server device 1 over the frequency channel on which the beacon signal is being output by the device 1 as mentioned above. As described with reference to FIG. 5, the transmission command control signal comprises a transmitting device ID designating the requesting device, a receiving device ID identifying the destination device, channel designation information specifying the channel on which the desired program is broadcast, and other information that may be needed by the wireless server device 1.

Upon receipt of the transmission command control signal from the wireless client device 2, the wireless server device 1 has all its circuits powered to get ready to transmit program data constituting the requested broadcast program, selects the channel over which to transmit the requested program data, and sends response information including information to designate the selected transmission channel to the requesting wireless client device 2 (step S2).

With this embodiment, the response signal is laid out in structure as shown in FIG. 5 and is transmitted wirelessly to the wireless client device 2 over the frequency channel on which the beacon signal is being output. Given the response signal from the wireless server device 1, the wireless client device 2 switches to the signal-receiving channel selected by the wireless server device 1.

The control unit 100 of the wireless server device 1 causes the currently unused tuner unit 11A or 11B to receive, demodulate or otherwise process the digital satellite broadcast signal in response to the transmission command control signal from the wireless client device 2 as mentioned above. The program data constituting the designated broadcast program are extracted, compressed, encrypted, and wirelessly transmitted to the wireless client device 2 over the selected transmission channel (step S3).

When receiving the program data wirelessly from the wireless server device 1 in step S3, the wireless client device 2 decrypts and decompresses the received data to form a video signal and a audio signal for reproduction. The video and audio signals are fed to the LCD 25 and speakers 26 respectively so that the user may enjoy the desired broadcast program.

When terminating the viewing of the broadcast program, the user of the wireless client device 2 operates the stop button switch on the operation panel unit 210. The control unit 200 of the wireless client device 2, upon detecting the operation of the stop button switch, composes a transmission stop command control signal accordingly, i.e., a signal requesting the stop of the program data transmission. The request signal is encrypted as described above and wirelessly transmitted to the wireless server device 1 over the frequency channel on which the beacon signal is being output (step S4).

On receiving the transmission stop command control signal from the wireless client device 2, the wireless server device 1 causes the tuner unit 11A or 11B to stop transmitting to the wireless client device 2 the broadcast program data that have been received, selected, encrypted and wirelessly transmitted. If no other wireless client device is accessing the wireless server device 1 for any broadcast program data, then the wireless server device 1 switches off its nonessential circuits and keeps only the essential minimum of its circuits powered continuously.

As described, the wireless communication system of this embodiment exchanges control signals and response signals over a specific frequency channel while allowing the program data constituting the main data to be wirelessly transmitted over another frequency channel selected by the wireless server device 1 as a transmission channel. In this setup, the wireless server device 1 can select an optimum frequency channel for program data transmission affected by a minimum of noise from other electronic apparatuses nearby.

The wireless client device 3, as with the client device 2 explained above, may likewise transmit a request signal to the wireless server device 1 to request the supply of a desired broadcast program. Needless to say, both the wireless client device 2 and the wireless client device 3 may concurrently transmit request signals to the wireless server device 1 to request the supply of preferred broadcast programs respectively.

FIGS. 8A, 8B and 8C are schematic views explaining transmission channels used by the wireless communication system of this embodiment. As shown in FIG. 8A, the wireless server device 1 outputs a beacon signal over a specific frequency channel to let the wireless client devices 2 and 3 join the communication system at any time. Control signals and response signals are transmitted and received over the frequency channel on which the beacon signal is being output.

If both the wireless client device 2 and the wireless client device 3 transmit signals requesting the supply of broadcast programs, the wireless server device 1 detects an unused frequency channel, forms a plurality of transmission channels (called slots) out of the channel on a time division basis, and transmits the program data over the transmission channels to the wireless client devices 2 and 3.

In the example of FIG. 8B, the wireless server device 1 is shown transmitting program data to the wireless client device 3 with the device ID of "02" over a first transmission channel CH1 formed on the frequency channel selected by the wireless server device 1; the server device 1 then transmits program data to the wireless client device 2 with the device ID of "01" over a second transmission channel CH2 on the server-selected frequency channel.

A transmission stop command control signal from the wireless client device 3 with the device ID of "02" terminates transmission of the program data to the client device 3. In that case, as depicted in FIG. 8C, the wireless server device 1 regards the channel CH2 as the first transmission channel formed on the frequency channel selected by the server, and transmits the program data to the wireless client device 2 with the device ID of "01" over that transmission channel CH2.

As described, when requested by the wireless client devices 2 and 3 to supply broadcast programs, the wireless server device 1 selects and uses an optimum frequency channel for signal transmission to the clients while avoiding channels affected by noise or used by other communication systems. It should be noted that power dissipation of the wireless server device 1 is minimized because it is designed to consume only a minimum of power in its standby state.

With this embodiment, the beacon, control and response signals have been described as transmitted and received over the frequency channel selected by the wireless server device 1. However, this is not limitative of the invention. A fixed channel may be set aside alternatively to permit transmission and reception of the beacon, control and response signals. It is also possible to fixedly establish channels over which to transmit the main data such as program data.

This embodiment was shown getting the wireless client device to select a frequency channel and to form out of that channel a plurality of transmission channels on a time division basis for signal transmission to the wireless client devices configured. Alternatively, the transmission channels may be constituted by time-based slots on a predetermined frequency channel or by logically identified channels in a random access setup.

[Operations of the Wireless Server Device 1, Wireless Client Device 2 and Wireless Client Device 3]

Described below with reference to the accompanying flowcharts are the workings of the wireless server device 1 as well as the wireless client devices 2 and 3 constituting the wireless communication system of this embodiment.

[Power-Up Processing of the Wireless Server Device 1]

FIG. 9 is a flowchart of steps carried out by the wireless server device 1 when the server is plugged into a commercial power outlet and powered therefrom.

As shown in FIG. 9, the wireless server device 1 is first plugged into a commercial power outlet and has an essential minimum of its circuits powered. The wireless server device 1 then selects out of a plurality of available frequency channels a suitable frequency channel with a minimum of noise and not used by any other communication system (step S101).

The wireless server device 1 starts outputting a beacon signal over the selected frequency channel while intermittently checking for any request signals from the wireless client devices 2 and 3 (step S102). Steps S101 and S102 in FIG. 9 allow the wireless server device 1 to prepare for the arrival of request signals from the wireless client devices 2 and 3 and make way for a subsequent execution of a main routine by the wireless server device 1, as shown in FIG. 11.

[Main Routine of the Clients 2 and 3]

The explanation of the main routine performed by the wireless server device 1 will be preceded for the moment by a description below of how the wireless client devices 2 and 3 carry out their main routine when composing a request signal and sending it to the wireless server device 1. FIG. 10 is a flowchart of steps constituting the main routine performed by the wireless client devices 2 and 3 when these devices are powered.

The control unit 200 of the wireless client device 2 or 3 first judges whether any operation key has been operated on the operation panel unit 250 (step S201). If in step S201 the control unit 200 judges that no operation is made by the user, the unit 200 repeats step S201 until an operation input from the user is detected.

If in step S201 the control unit 200 detects any operation input by the user, a check is made to see if any channel selection button switch is operated on the operation panel unit 250 (step S202). If in step S202 any channel selection button switch is judged operated, the control unit 200 carries out a channel button routine step 203 to generate a transmission command control signal, i.e., a signal requesting the supply of the broadcast program corresponding to the operated channel button. Step S201 is then reached again and subsequent steps are repeated.

If in step S202 the operated key is not judged to be any channel button, the control unit 200 checks to see if the stop button has been operated (step S204) If the stop button is judged operated in step S204, the control unit 200 executes a stop button routine to generate a transmission stop command control signal, i.e., a signal requesting termination of the supply of the requested broadcast program (step S205). Then step S201 is reached again and subsequent steps are repeated.

If in step S204 the operated key is not judged to be the stop button, the control unit 200 checks to see if the operated key is a recording preset button (step S206). If the recording preset button is judged operated in step S206, the control unit 200 carries out a recording preset button routine to receive the input of preset recording information and forward the received information to the wireless server device 1 (step S207) Step S201 is then reached again and subsequent steps are repeated.

If in step S206 the operated key is not judged to be the recording preset button, the control unit 200 checks to see if the user has operated a reproduction button to designate reproduction of recorded program data (step S208). If the operated key is judged to be the reproduction button in step S208, the control unit 200 executes a reproduction button routine to generate a signal requesting reproduction of the recorded program data desired (step S209). Step S201 is again reached and subsequent steps are repeated.

If in step S208 the operated key is not judged to be the reproduction button, the control unit 20 performs some other process (step S210). The expression "some other process" signifies any process other than step S203, S205, S207 or S209, such as the setting of various items of information to the wireless client devices 2 and 3. Further judging steps may also be included depending on the processes that may be carried out.

In the manner described, the wireless client devices 2 and 3 wait for an operation input from the user. Upon receipt of the operation input from the user, the client device generates a request signal immediately in response to the operated key and transmits the generated signal to the wireless server device 1.

[Main Routine of the Wireless Server Device 1]

Described below is the main routine executed by the wireless server device 1 receiving request signals from the wireless client devices. The steps shown in FIG. 9 prepare the wireless server device 1 for the arrival of request signals from the wireless client devices 2 and 3. When checking intermittently for a request signal from the wireless client device 2 or 3, the control unit 100 of the wireless server device 1 carries out the main routine shown in FIG. 11.

The control unit 100 of the wireless server device 1 first judges whether any request signal has been received from the wireless client device 2 or 3 while checking intermittently for such signals based on information from the incoming data decomposing unit 18 (step S301). If in step S301 no signal is judged to be received from the wireless client devices, the control unit 100 repeats step S301 until a request signal comes in from the wireless client devices.

If in step S301 a request signal is judged to be received from the wireless client device 2 or 3, the control unit 100 supplies power to all circuits of the wireless server device 1 to handle the request from the client (step S302).

The control unit 100 of the wireless server device 1 causes the decryption unit 19 to decrypt information making up the request signal from the wireless client device (step S303). The control unit 100 then judges whether the decrypted request information constitutes a program data transmission command (step S304).

That is, in step S304, a check is made to see if the client device requests the supply of any broadcast program contained in a digital satellite broadcast and received selectively by the wireless server device 1. If in step S304 the request signal from the wireless client device is judged to be a transmission command, the control unit 100 carries out a program transmission routine (to be described later) to supply the designated broadcast program to the requesting client (step S305). Step S301 is then reached again and subsequent steps are repeated.

If in step S304 the request signal from the wireless client device is not judged to be a transmission command, the control unit 100 judges whether the request is a stop command (step S306). If the request signal is judged to be the stop command from the wireless client device, the control unit 100 performs a transmission stop routine (to be described later) to terminate the supply of the designated broadcast program to the client (step S307). Step S301 is reached again and subsequent steps are repeated.

If in step S306 the request signal is not judged to be the stop command from the wireless client device, the control unit 100 judges whether the request signal is a recording preset command (step S308). If the request signal is judged to be the recording preset command in step S308, the control unit 100 executes a recording preset routine (to be described later) to receive the presetting of a desired broadcast program for unattended recording. Step S301 is then reached again and ensuing steps are repeated.

If in step S308 the request signal is not judged to be the recording preset command from the wireless client device, the control unit 100 judges whether the request signal constitutes a recording reproduction command designating reproduction of a recorded broadcast program (step S310). If in step S310 the request signal from the wireless client device is judged to be the recording reproduction command, the control unit 100 carries out a recording reproduction routine (to be described later) to retrieve and reproduce the designated broadcast program from the hard disc drive 150 of the wireless server device 1.

If in step S308 the request signal is not judged to be the recording reproduction command from the wireless client device, the control unit 100 performs some other process (step S312). "Some other process" here signifies any process other than step S305, S307, S309 or S311, such as the setting of various items of information to the wireless server device 1. Further judging steps may also be included depending on the processes that may be carried out.

In the manner described, the wireless server device 1 waits for request signals to arrive from the wireless client devices 2 and 3. Upon receipt of a request signal from the client device 2 or 3, the wireless server device 1 rapidly executes necessary steps to deal with the request.

[Processing by the Wireless Server Device 1, Wireless Client Device 2 and Wireless Client Device 3]

Described below are the processes included in the main routine performed by the wireless client devices 2 and 3 as shown in FIG. 10, and the processes in the main routine executed by the server device 1 as shown in FIG. 11. The processes (implemented in the form of routines) carried out parallelly by both the wireless client device 2 or 3 and the wireless server device 1 will be explained below in parallel.

In the description that follows, wireless communication will be shown to take place illustratively between the wireless client device 2 and the wireless server device 1. Although not described, the same communication will also be carried out between the wireless client device 3 and the wireless server device 1.

[Transmission and Reception of Programs]

First to be described are the channel button routine carried out in step S203 of the main routine for the wireless client devices 2 and 3 shown in FIG. 10, and the program transmission routine executed in step S305 of the main routine for the wireless server device 1 depicted in FIG. 11.

FIG. 12A is a flowchart of steps making up the channel button routine in step S203 of the main routine for the wireless client devices 2 and 3 in FIG. 10; FIG. 12B is a flowchart of steps constituting the program transmission routine in step S305 of the main routine for the wireless server device 1 in FIG. 11.

As shown in FIG. 12A, the user of the wireless client device 2 first operates the channel buttons on the operation panel unit 210 of the device 2. In turn, the control unit 200 of the wireless client device 2 composes information requesting the supply of a broadcast program over the channel corresponding to the operated channel button, and feeds the request information to the encryption unit 27 for encryption (step S401).

The encrypted request signal is forwarded to the outgoing signal composing unit 28. The control unit 200 of the wireless client device 2 causes the outgoing signal composing unit 28 to compose a transmission command control signal, i.e., a request signal furnished with a header, a transmitting device ID, a receiving device ID, and an error code as mentioned earlier with reference to FIG. 5. The transmission command control signal is transmitted wirelessly to the wireless server device 1 (step S402).

The transmission command control signal is received by the wireless server device 1 and decrypted as described above with reference to FIG. 11. With the content of the control signal revealed, the wireless server device 1 carries out correspondingly the program transmission routine in step S305 of FIG. 11 in a manner depicted in FIG. 12B.

Upon receipt of the transmission command control signal, the control unit 100 of the wireless server device 1 first selects a frequency channel for use in transmitting program data to the requesting client device 2 as shown in FIG. 12B (step S501).

The control unit 100 of the wireless server device 1 then formulates a response signal including information designating the frequency channel selected in step S501. The response signal is transmitted to the requesting client device 2 via the encryption unit 14, outgoing data composing unit 15, wireless transceiver unit 16, and transceiver antenna 17 (step S502).

The control unit 100 of the wireless server device 1 causes the tuner unit 11A or 11B to start extracting the broadcast program designated by the transmission command control signal from the wireless client device 2 (step S503). The wireless server device 1 then compresses the program data constituting the broadcast program extracted in step S503 by use of the data compression processing unit 13, and causes the encryption unit 14 to start encrypting the program data (step S504).

The program data thus compressed and encrypted are fed successively to the outgoing data composing unit 15. In turn, the outgoing data composing unit 15 starts composing a signal furnished with a receiving device ID and transmitting the composed signal to the requesting wireless client device 2 (step S505). This terminates the program transmission routine shown in FIG. 12B.

On the other hand, as explained above with reference to the sequence diagram in FIG. 7 and as shown in FIG. 12A, the wireless client device 2 judges whether a response signal is received from the wireless server device 1 to which the transmission command control signal has been transmitted (step S403). Step S403 is repeated until the response signal is received.

If in step S403 the response signal destined for the own device is judged to be received from the wireless server device 1, the control unit 200 of the client device 2 switches to the frequency channel designated by the response signal and starts receiving packets that are transmitted over that frequency channel (step S404).

The information sent in packets from the wireless server device 1 is decrypted and reproduced. The client device in question thus starts reproducing images and audio corresponding to the program data making up the designated broadcast program (step S405). This terminates the channel button routine shown in FIG. 12A.

As described, the user of the wireless client device 2 first transmits to the wireless server device 1 a transmission command control signal requesting the supply of a broadcast program from the server, and receives the program of interest from the server device 1 in accordance with the control program for viewing and listening purposes.

In the case above, the wireless server device 1 extracts the program data constituting the broadcast program designated by the transmission command control signal that has come from the wireless client device 2, and transmits wirelessly only the extracted program data to the requesting client device 2 or 3. That means the wireless server device 1 need not supply all client devices—whether or not they request any programs—with whatever programs contained in the digital satellite broadcast captured by the server. This eliminates the wasteful use of transmission signals.

[Termination of Program Data Transmission]

Next to be described are the stop button routine carried out in step S205 of the main routine for the wireless client device shown in FIG. 10, and the transmission stop routine executed in step S307 of the main routine for the wireless server device depicted in FIG. 11.

Figure 13A:
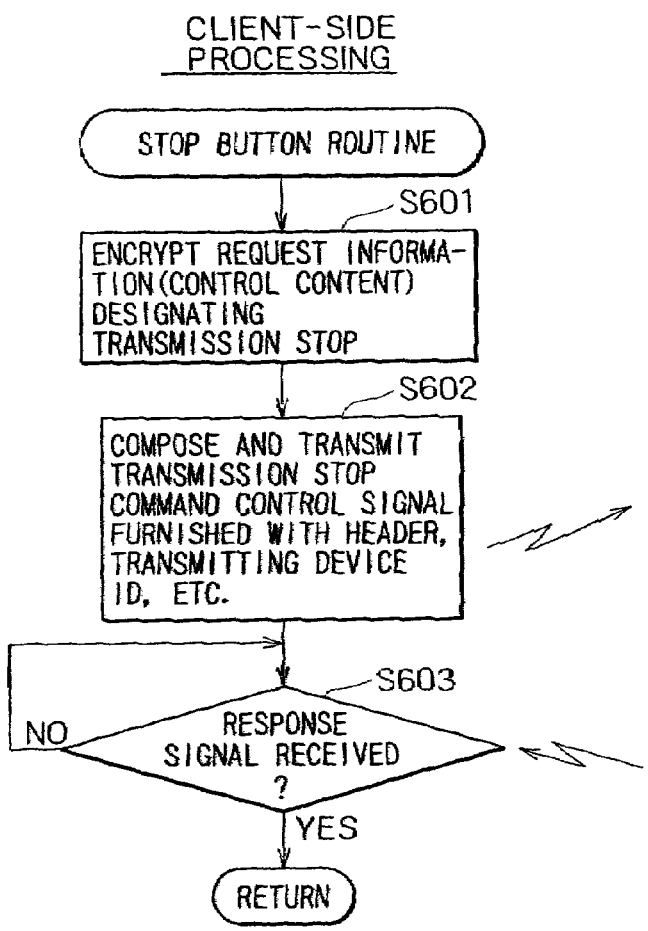
FIGS. 13A and 13B are flowcharts of steps performed by the wireless server device and wireless client devices for stopping wireless data transmission therebetween.
Figure 13B:
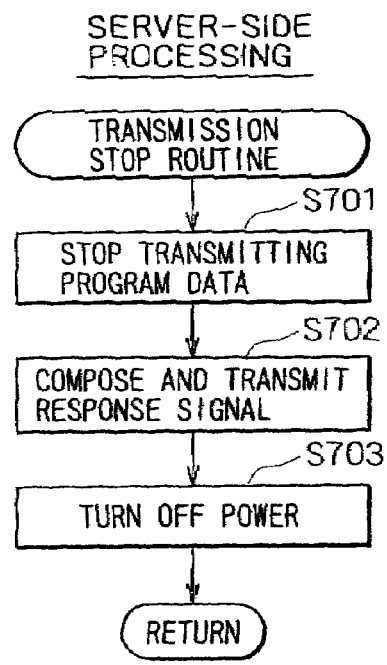

FIG. 13A is a flowchart of steps making up the stop button routine in step S205 of the main routine for the wireless client devices in FIG. 10; FIG. 13B is a flowchart of steps constituting the transmission stop routine in step S307 of the main routine for the wireless server device in FIG. 11.

As shown in FIG. 13A, the user of the wireless client device 2 operates the stop button on the operation panel unit 210 of the device 2. In turn, the control unit 200 of the wireless client device 2 composes information requesting the termination of program data transmission and feeds the request information to the encryption unit 27 for encryption (step S601).

The encrypted request signal is forwarded to the outgoing signal composing unit 28. The control unit 200 of the wireless client device 2 causes the outgoing signal composing unit 28 to compose a transmission stop command control signal, i.e., a request signal furnished with a header, a transmitting device ID, a receiving device ID, and an error code as shown in FIG. 5. The transmission stop command control signal thus composed is transmitted wirelessly to the wireless server device 1 (step S602).

The transmission stop command control signal is received by the wireless server device 1 and decrypted as described above with reference to FIG. 11. With the content of the control signal revealed, the wireless server device 1 carries out correspondingly the transmission stop routine in step S307 of FIG. 11 in a manner depicted in FIG. 13B.

Upon receipt of the transmission stop command control signal, the control unit 100 of the wireless server device 1 controls relevant components to stop transmission of the program data constituting the broadcast program designated by the requesting client device 2, as shown in FIG. 13B (step S701).

The control unit 100 of the wireless server device 1 then generates a response signal indicating that the data transmission has ended, and transmits the signal to the requesting wireless client device 2 (step S702). If no other wireless client device is accessing the wireless server device 1, then the server device 1 switches off its nonessential circuits and keeps only the essential minimum of its circuits active (step S703). This terminates the transmission stop routine shown in FIG. 13B.

On the other hand, as explained above with reference to the sequence diagram in FIG. 7 and as shown in FIG. 13A, the wireless client device 2 or 3 judges whether a response signal is received from the wireless server device 1 to which the transmission stop command control signal has been transmitted (step S603). Step S603 is repeated until the response signal is received. When the response signal is received, the stop button routine of FIG. 13A is terminated.

As described, the user of the wireless client device 2 first transmits to the wireless server device 1 a transmission stop command control signal requesting the termination of wireless program data transmission from the server.

[Presetting of Broadcast Programs for Unattended Recording]

Described next are the client-side recording preset routine carried out in step S207 of the main routine for the wireless client devices 2 and 3 shown in FIG. 10, and the server-side recording preset routine executed in step S309 of the main routine for the wireless server device 1 depicted in FIG. 11.

FIG. 14A is a flowchart of steps making up the client-side recording preset routine in step S207 of the main routine for the wireless client devices 2 and 3 in FIG. 10; FIG. 14B is a flowchart of steps constituting the server-side recording preset routine in step S309 of the main routine for the wireless server device 1 in FIG. 11.

As shown in FIG. 14A, the user of the wireless client device 2 operates the recording preset button on the operation panel unit 210 of the client device 2. In turn, the control unit 200 of the wireless client device 2 causes the reproduction processing unit 24 to display on the LCD 25 an input screen into which necessary information such as a user ID is entered; the control unit 200 is now ready to accept the information input (step S801). The user of the wireless client device is prompted to enter his or her user ID, the date on which a desired program is to be broadcast, and other relevant information.

The user ID signifies identification information furnished uniquely to each user accessible to the wireless communication system of this embodiment. With this wireless communication system, the user ID authorizes each user to record or view desired programs under certain restrictions.

The control unit 200 of the wireless client device 2 encrypts the user-issued recording preset request including the user ID (step S802). The encrypted request is sent to the outgoing data composing unit 28 which, in turn, composes outgoing data based on a predetermined layout and wirelessly transmits the data to the wireless server device 1 (step S803).

The wireless server device 1 receives the recording preset request, decrypts the request as described above with reference to FIG. 11 to find out what is designated thereby, and carries out accordingly in step S309 of FIG. 11 the server-side recording preset routine shown in FIG. 14B. More specifically, upon receipt of the recording preset request, the control unit 100 of the wireless server device 1 first generates recordable program information (i.e., program guide) corresponding to the user ID included in the recording preset request, encrypts the information, and transmits the encrypted information to the wireless client device as shown in FIG. 14B (step S901)

EPG (electronic programming guide) information contained in the digital satellite broadcast signal serves to associate individual programs with their ratings: X-rated programs are for adults only, and R-rated programs are unfit for children under 16. The EPG information is used to restrict the viewing of programs available for individual users.

A restriction table detailing user-specific available programs is prepared beforehand in the EEPROM 104 of the wireless server device 1. FIG. 15 is an explanatory view of a typical restriction table created in advance in the EEPROM 104. In the table for the wireless communication system of the embodiment, user IDs are expressed by three numeric characters such as "001," "002" and "003."

Restrictions on available programs are established depending on the users. Illustratively, in the table of FIG. 15, a user with the user ID of "001" is identified as an adult who is free from all restrictions on viewing. Another user with the user ID of "002" is identified as a person aged between 16 and 19 who is subject to the X-rated (adults only) restriction. Another user with the user ID of "002" is identified as a person under 16 who is subject to both the X-rated (adults only) and the R-rated (unfit for persons under 16) restrictions.

Recordable program information is created in accordance with the above-described user-specific restrictions and transmitted to the wireless client device 2. In turn, the wireless client device 2 receives the encrypted recordable program information from the wireless server device 1, decrypts the received information, and displays the decrypted information on the LCD 25 (step S804). The wireless client device 2 is now ready to accept the user's selective presetting of a broadcast program for unattended recording (step S805).

The control unit 200 of the wireless client device 2 accepts the user's selective designation of the broadcast program to be recorded, encrypts the program designating information in the same manner as the recording preset command mentioned above, and transmits the encrypted information to the wireless server device 1 (step S806). The control unit 200 of the wireless client device 2 then checks to see if a preset complete button switch is operated (step S807).

If in step S807 the preset complete button switch is not judged operated, the control unit 200 of the wireless client device 2 returns to step S805 and repeats the ensuing steps. If in step S807 the preset complete button switch is judged operated, the control unit 200 composes a preset complete command signal and sends the signal to the wireless server device 1 (step S808). This terminates the client-side recording preset routine in FIG. 14A.

On the other hand, as shown in FIG. 14B, the wireless server device 1 wirelessly receives information designating the program to be recorded from the wireless client device 1 in step S805 of FIG. 14A. The received information is decrypted before being placed into the EEPROM 104 (step S902). A check is then made to see if a preset complete command is received from the wireless client device 2 (step S903).

If in step S903 the preset complete command is not judged to be received, the control unit 100 of the wireless server device 1 returns to step S902 and repeats the ensuing steps. If in step S903 the preset complete command is judged to be received, the control unit 100 verifies that no other wireless client device is accessing the wireless server device 1 and causes the server device 1 to switch off its nonessential circuits and to keep only the essential minimum of its circuits active (step S904). This terminates the server-side recording preset routine in FIG. 14B.

The steps above create a recording preset table in the EEPROM 104 of the wireless server device 1. FIG. 16 is an explanatory view showing how a recording preset table is typically created in the EEPROM 104 of the server 1. The recording preset table of this embodiment in FIG. 16 comprises such information as presetting device IDs, user IDs, start and end times and dates for broadcast programs to be recorded, applicable broadcast channels, and monitor classifications made up of user and device attributes.

The presetting device ID specifies the device that has made the presetting and is identical to the transmitting device ID added to the recording preset request sent from the wireless client device. The user ID is attached to the recording preset request in step S802 of FIG. 14A before being transmitted to the wireless server device 1.

The start and end times and dates for broadcast programs to be recorded are designated by the wireless server device 1 based on the EPG or like information when the server 1 has received the user-preset program recording information from the wireless client device. In other words, once the user of the wireless client device designates a specific program to be recorded, the wireless server device 1 of this embodiment determines accordingly the start and end times and dates of the program in question. The same process also applies to the broadcast channels to be preset.

The user and device attributes of monitor classifications are determined by the user of the wireless client device. The user attribute is used to specify whether a given program preset for recording may be viewed only by a specific user when reproduced or may be viewed by anyone. The device attribute is used to designate whether the preset program may be viewed only via the presetting device or by any wireless client device configured.

The user attribute is set for "1" if the preset program should be viewed only by the user who carried out the presetting, and set for "0" where the program may be viewed by anyone. The device attribute is set for "1" if the preset program should be viewed only via the client device through which the presetting was made, and set for "0" where the program may be viewed via any wireless client device.

In the recording preset table of FIG. 16, the first row (i.e., sequence No. 1) specifies illustratively that only the user with the user ID of "003" may view the recorded program at only the wireless client device with the device ID of "01." The second row (sequence No. 2) designates that the only the user with the user ID of "003" may view the recorded program at whatever wireless client device (i.e., device 2 or 3).

The third row (sequence No. 3) in the recording preset table of FIG. 16 specifies that any user may view the recorded program provided he or she uses the wireless client device 2 with the device ID of "01." Although not shown in FIG. 16, the recorded programs may be viewed by any user at any wireless client device if the user and device attributes are both set for "0."

As will be described later, a command transmitted by the wireless client device to the server device to reproduce a recorded program therefrom is furnished with both the user ID and the requesting device ID. Such ID information is used to restrict the users and devices allowed to monitor the reproduced program.

[Execution of Preset Recording]

Figure 17:
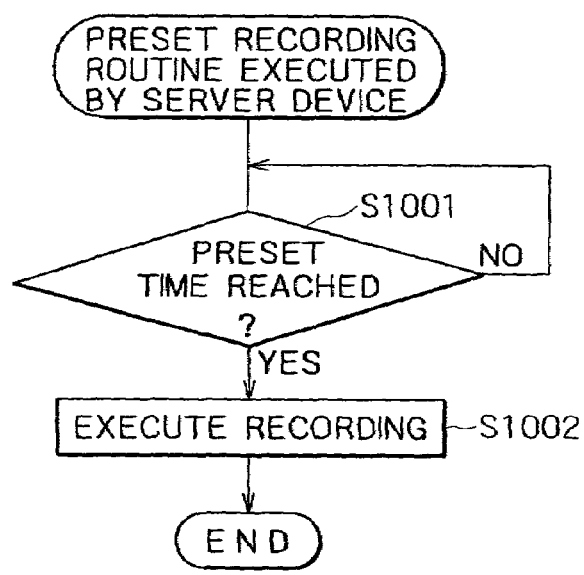
FIG. 17 is a flowchart of steps constituting a preset recording process executed by the wireless server device 1.

What follows is a description of how the wireless server device 1 executes preset recording based on the recording preset table prepared in the EEPROM 104 of the server device as described above with reference to FIG. 14. FIG. 17 is a flowchart of steps constituting a preset recording process executed by the wireless server device 1.

The control unit 100 of the wireless server device 1 checks to see if any one of the preset start times and dates in the recording preset table in the EEPROM 104 is reached in reference to the current time data from the clock circuit 105 of the own device (step S1001).

If in step S1001 any one of the preset start times and dates is judged reached, the control unit 100 executes recording of the broadcast program associated with the start time and date in question (step S1002). This terminates the routine shown in FIG. 17.

Each preset broadcast program is recorded to the hard disc drive 150 via the interface 106. The compressed program data from the data compression processing unit 13 are fed either to the decryption unit 14 or to the hard disc drive 150 acting as storing means.

If in step S1001 any one of the preset start times and dates is not judged reached, the control unit 100 repeats step S1001 until one of the preset start times and dates for broadcast programs to be recorded is reached.

In the manner described, preset broadcast programs are recorded reliably to the hard disc drive 150 based on the recording preset table created in the EEPROM 104 of the wireless server device 1. As will be described later, the programs recorded on the hard disc drive 150 may be reproduced as requested by the wireless client device for viewing by the user.

[Reproduction of Recorded Programs]

Below is a description of the client-side recording reproduction routine executed in step S209 of the main routine for the wireless client devices 2 and 3 shown in FIG. 10, and the server-side recording reproduction routine carried out in step S311 of the main routine for the wireless server device 1 shown in FIG. 11.

FIG. 18A is a flowchart of steps constituting the client-side recording reproduction routine in step S209 of the main routine for the wireless client devices 2 and 3 in FIG. 10; FIG. 18B is a flowchart of steps making up the server-side recording reproduction routine in step S311 of the main routine for the wireless server device 1 in FIG. 11.

As shown in FIG. 18A, the user of the wireless client device 2 or 3 operates the recording reproduction button on the operation panel unit 210 of the client device. In turn, the control unit 200 of the client device causes the reproduction processing unit 24 to display on the LCD 25 an input screen into which the user ID of the requesting user is entered. The control unit 200 accepts the input of the user ID from the user of the wireless client device (step S1101).

The control unit 200 of the wireless client device 2 or 3 composes a reproduction request including the user ID and encrypts the request (step S1102). The encrypted reproduction request is fed to the outgoing data composing unit 28. Given the encrypted request, the composing unit 28 composes outgoing data based on a predetermined layout and wirelessly transmits the data to the wireless server device 1 (step S1103).

The reproduction request is received by the wireless server device 1 and decrypted as described above with reference to FIG. 11. With the content of the request revealed, the server-side recording reproduction routine of FIG. 18B is carried out accordingly in step S311 of FIG. 11. Given the reproduction request, the control unit 100 of the wireless server device 1 creates recording list information (recording program list) according to the user ID contained in the request, encrypts the list information, and transmits the encrypted information to the wireless client device (step S1201).

That is, what the control unit 100 of the wireless server device 1 creates is the recording list information making up a list of recorded programs which were recorded in keeping with the recording preset table in the EEPROM 104 of the control unit and which are judged available for reproduction based on the user ID identifying the requesting user. The list thus created is encrypted before being transmitted.

The wireless client device receives and decrypts the recording list information coming from the wireless server device 1, and displays the decrypted information on the LCD 25 (step S1104). The selective designation of a recorded broadcast program to be reproduced is now accepted from the user (step S1105).

Upon selective input of the recorded broadcast program to be reproduced, the control unit 200 of the wireless client device encrypts information designating the selected program as in the case of the reproduction request above, and transmits the encrypted information to the wireless server client 1 (step S1106). The control unit 200 then judges whether a reproduction execution command is input (step S1107). The process of step S1107 constitutes verification of a command given by the user to reproduce the recorded program selected. The command typically involves the user effecting another push on the reproduction button.

If in step S1107 the reproduction execution command is not judged input, the control unit 200 of the wireless client device returns to step S1105 and repeats the ensuing steps.

If in step S1107 the reproduction execution command is judged input, the control unit 200 composes a reproduction execution command signal and transmits the signal to the wireless server device 1 (step S1108).

In response, the data constituting the selected broadcast program are retrieved from the hard disc drive 150 of the wireless server device 1 and transmitted. Upon receipt of the data transmission, the requesting client device starts decrypting and reproducing the received data (step S1109). This terminates the client-side reproduction routine shown in FIG. 18A.

On the other hand, as depicted in FIG. 18B, the wireless server device 1 wirelessly receives from the wireless client device the information designating the recorded program to be reproduced selectively, and decrypts the received information. The decrypted information allows the server device 1 to identify the selected program recorded on the hard disc drive 150 (step S2102). The server then waits for a reproduction execution command to be transmitted from the wireless client device (step S1203).

If in step S1203 the reproduction execution command is judged to be received from the wireless client device, the control unit 100 of the wireless server device 1 retrieves the broadcast program identified in step S1202 from the hard disc drive 150, encrypts the retrieved program data, and transmits the encrypted data to the requesting wireless client device (step S1204). The encryption unit 14 of the wireless server device 1, it should be noted, selectively receives one of three types of data: program broadcast data which are fed from the data compression processing unit 13 after being received by the tuner and which are not time-shifted; broadcast program data time-shifted and recorded to the hard disc drive 150; and control information generated by the control unit 100 for transmission by the wireless server device 1 to the wireless client device.

The control unit 100 of the wireless server device 1 judges whether reproduction of the designated broadcast program, i.e., transmission of the program to the requesting wireless client device, has ended (step S1205). If the reproduction is not judged terminated, step S1204 is repeated. If the transmission of the requested broadcast program to the wireless client device is judged to have ended in step S1205, the wireless server device 1 ascertains that it is not being accessed by any other wireless client device, and switches off its nonessential circuits while keeping only the essential minimum of its circuits active (step S1206). This terminates the server-side reproduction routine in FIG. 18B.

In the manner described, users of the wireless client devices 2 and 3 may request at any time the wireless server device 1 to reproduce recorded broadcast programs from the hard disc drive 150 of the server device 1. The user and device attributes under the monitor classifications mentioned above as well as the restrictions in the table of FIG. 15 readily allow the recorded program data to be reproduced and viewed selectively depending on the user's identification.

[Encryption and Decryption]

In the wireless communication network of this embodiment, the transmitting side encrypts the main data such as program data and request signals while the receiving side decrypts received data and requests. The scheme is designed to inhibit spillover signals of the wireless communication system from getting tapped by receivers in the neighborhood, thereby protecting the privacy of users of the system.

The wireless communication system of this embodiment constitutes illustratively a home network system set up in the household. In that setup, transmitting and receiving devices are assigned beforehand a public key each to make up a public key cryptosystem.

The above setup may be supplemented over time with more wireless server devices or wireless client devices or may have some of its component devices replaced by new ones. Every time the wireless communication system is thus newly configured, users are required to assign new public keys to the component devices, which can be a bothersome chore. During the key assigning process, there might occur errors or even key data spillovers to the outside.

Such potential deficiencies may be bypassed by the wireless communication system of this invention as follows: the devices configured in the system are each provided with a unique private key according to which a public key is generated. The public key, shared by all configured devices, is used in combination with private keys as a basis for any two communicating devices to formulate a temporary key therebetween in a variation of public key cryptosystem. The temporary key is used to encrypt the public key so that the latter may be shared securely by the component devices.

Figure 19:
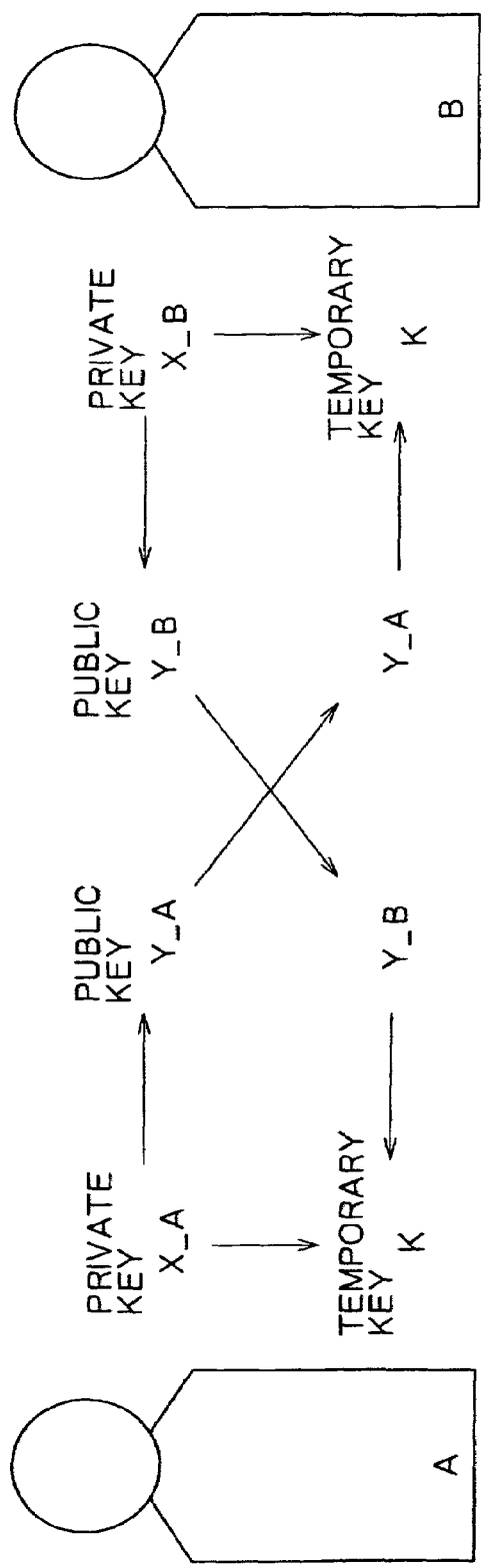
FIG. 19 is a schematic view explaining how a public key is set for each of interconnected devices based on a public key cryptosystem.

FIGS. 19 and 20 are explanatory views showing how a public key is set for each of the configured devices in a public key cryptosystem. In FIG. 19, reference characters A and B denote users' devices that encrypt data and exchange the encrypted data therebetween. Reference characters X_A stand for the private key of the device A; X_B for the private key of the device B; Y_A for the public key of the device A; and Y_B for the public key of the device B. The private keys are typically composed of a random number generated by each of the devices A and B.

As shown in FIG. 19, the device A generates its public key Y_A using its own private key X_A, and transmits the public key Y_A wirelessly to the device B. Likewise, the device B generates its public key using its own private key Y_B, and transmits the public key Y_B wirelessly to the device A.

The device A generates a temporary key K based on its private key X_A and on the public key Y_B sent from the device B. The device B formulates the temporary key K based on its private key X_B and on the public key Y_A transmitted from the device A.

The public key Y_A of the device A and the public key Y_B of the device B are generated on the basis of the formulas shown in the "Public Key" boxes in FIG. 20. In these formulas, reference character "g" stands for a primitive root, "p" for a prime number, and "mod" for a module arithmetic. A formula "(X_A) modp" specifies that the number "X_A" is to be divided by the prime number "p" to give a residue. Also in FIG. 20, reference character "·" denotes a multiplication, and "^" to the right of "g," "A" and "B" represents the power of a number. Using these formulas, the devices A and B generate their public keys Y_A and Y_B based on their private keys X_A and X_B and send the generated public keys to each other.

The devices A and B generate their temporary key K on the basis of the formulas shown in the "Temporary Key" boxes in FIG. 20. In these formulas, "g," "p" and "mod" have the same meanings as in the formulas for the public key generation. The formulas in the "Temporary Key" boxes indicate that the device A generates the temporary key K based on its own private key X_A and on the public key Y_B coming from the device B. The formulas also show that the device B produces the temporary key K based on its own private key X_B and on the public key Y_Y sent from the device A.

It follows that each of the devices A and B, using its own private key X_A or X_B, can generate a temporary key K that is common to the two devices. This kind of public key cryptosystem, exemplified by the Diffie-Hellman key agreement method, allows two communicating devices to share the temporary key K by transmitting to one another a public key generated on the basis of their unique private keys. The temporary key is used to encrypt the public key, so that the encrypted public key is transmitted securely to each of the communicating devices for use in their information encrypting processes.

The public key Y_A or Y_B may spill over to other wireless communication systems without any data security concern. The reason is that any leaked public key is of no use in restoring the original private key. Generating a temporary key based on the public key is equivalent to producing that temporary key by use of the private key of the other communicating device, as shown in FIG. 20.

The public key cryptosystem above eliminates the need for users to enter private keys or to exchange them between their devices. Furthermore, the system enables private keys to be updated as needed. These features make it possible to maintain an encryption environment at high levels of secrecy.

In the wireless communication system of this embodiment, users of the wireless client devices 2 and 3 may operate their devices regardless of their locations and without becoming conscious of their connections to the wireless server device 1. The setup offers enhanced degrees of freedom in configuring the wireless server device and wireless client devices, the server device providing tuning and recording functions in the form of tuner units and the hard disc drive, the client devices acting primarily as a monitor each.

The device ID and encryption features permit secure protection of copyrights regarding exchanged data and of the users making use of the system. The user IDs enable the available data to be restricted according to the users' identities.

The exchanged data are furnished with the error detection code. The feature makes it possible to establish, even in a relatively limited area such as the household, a reliable wireless communication system highly immune to transmission errors.

Furthermore, not only the program data but also control information such as requests is encrypted before being transmitted and received. This protects the privacy of users of the wireless client devices in a highly secure manner.

In the above-described embodiment, encryption and decryption were shown implemented in the form of a public key cryptosystem capable of public key exchanges. However, this is not limitative of the invention. Alternatively, other suitable cryptosystems may be adopted.

The above-described embodiment was shown constituting a wireless communication system made up of one wireless server device and two wireless client devices. Alternatively, as many wireless client device as desired may be connected (provided there should be at least one client device). A plurality of wireless server device may also be established in the system.

For the embodiment above, user IDs were shown entered as needed by operation of the keys on the operation panel unit of each wireless client device. Alternatively, a user may initially set his or her user ID in the EEPROM of his or her own wireless client device prior to use. When a user ID is subsequently required to be entered, the previously established user ID data may be retrieved from the memory.

Each wireless client device may be furnished with a slot for accommodating an external memory such as a memory card. In that setup, the control unit may be arranged to read information from the external memory in the slot. Each user may have his or her own external memory such as a memory card that contains his or her user ID. When using a wireless client device, the user may insert the external memory (e.g., memory card) into the slot of the device to get authorization based on the user ID retrieved from the memory.

For the embodiment above, the CRC code was shown utilized as the error detection code. Alternatively, parity check, Hamming code or any other suitable error detection method may be adopted.

For the above-described embodiment, the main data signals were shown to be program data composed of video and audio data constituting TV broadcast programs. However, the main data are not limited to the program data alone. Alternatively, the main data may be constituted solely by video data such as moving or still pictures or only by audio data; the main data may also be computer programs, text data, or any other digital data.

As described above, this invention may be implemented in the form of a wireless communication system which may be established in a limited area such as the household and which is capable of wirelessly exchanging data without wasteful power dissipation or wireless band abuses. Because varieties of data are transmitted and received in wireless fashion, the component devices making up the wireless communication system benefit from enhanced degrees of freedom in their locations.

The use of device IDs and the encryption function ensure copyright protection for the exchanged data as well as privacy protection for users. The user IDs are used to restrict the data available to users depending on their identities.

The data transmitted an received within the system are provided with the error detection code. This makes it possible to establish, in a relatively limited area such as the household, a reliable wireless communication system highly immune to transmission errors.

As many apparently different embodiments of this invention may be made without departing from the spirit and scope thereof, it is to be understood that the invention is not limited to the specific embodiments thereof except as defined in the appended claims.

What is claimed is:

1. A wireless data transmitting and receiving system having a server device connected wirelessly to a plurality of client devices constituting a wireless network for transmitting and receiving data packets on a time division basis between said server device and said plurality of client devices over said wireless network, wherein each of said client devices comprises:

first wireless communicating means for wirelessly transmitting and receiving data to and from said server device;

first identification data storing means for storing device identification data unique to each of the plurality of client devices connected wirelessly to said wireless network;

first packet evaluating means for evaluating the data packets received by said first wireless communicating means so as to extract from the received data packets only those data packets addressed to the respective client device based on said device identification data stored in said first identification data storing means;

first encryption key storing means for storing an encryption key shared only by the client devices connected to said wireless network, said encryption key being used to encrypt and decrypt data communicated over said wireless network;

first decrypting means for decrypting encrypted data by use of said first encryption key stored in said encryption key storing means;

reproducing means for reproducing the data decrypted by said first decrypting means;

operating means for inputting a command requesting said server device to transmit the data to be reproduced by said reproducing means;

first encrypting means for encrypting control data to be transmitted to said server device by use of said encryption key stored in said first encryption key storing means;

packet composing means for composing said control data encrypted by said first encrypting means into packets each furnished with said device identification data stored in said first identification data storing means and with receiving device identification data designating said server device as the device to receive said control data; and first controlling means for controlling, based on said command for controlling said server device, said encrypting means, said packet composing means and said first wireless communicating means so as to cause said first wireless communicating means to transmit the data packets for controlling said server device by way of said first wireless communicating means, and wherein said server device comprises:

second wireless communicating means for wirelessly transmitting and receiving data packets to and from said client devices over said wireless network;

second identification data storing means for storing the device identification data unique to each of the client devices connected wirelessly to said wireless network;

second packet evaluating means for evaluating the data packets received by said second wireless communicating means so as to extract from the received packets only those packets addressed to the server device based on said device identification data stored in said second identification data storing means;

second identification data holding means for holding first device identification data for identifying the device that transmitted the extracted packets;

second encryption key storing means for storing said encryption key shared only by the client devices connected to said wireless network, said encryption key being used to encrypt and decrypt the data communicated over said wireless network;

second decrypting means for decrypting the encrypted control data transmitted in the data packets that were received and extracted, the decryption being done by use of said second encryption key stored in said second encryption key storing means;

inputting means for inputting data destined for reproduction by said client devices;

compressing means for compressing the reproduction-destined input data;

second encrypting means for encrypting the compressed reproduction-destined data based on said encryption key stored in said second encryption key storing means;

packet composing means for composing the encrypted reproduction-destined data into packets each furnished with said device identification data stored in said second identification data storing means and with device identification data designating the wireless device receiving said encrypted reproduction-destined data; and second controlling means which, based on the control data extracted by said second packet evaluating means and decrypted by said second decrypting means, causes said inputting means to input the reproduction-destined data as designated by said control data; causes said second encrypting means to encrypt the reproduction-destined input data by use of said encryption key stored in said second encryption key storing means; causes said packet composing means to compose packets to be transmitted, each of the composed packets being constituted by the encrypted reproduction-destined data, by said second device identification data which are held in said second identification data holding means and which identify the device having transmitted said control data, and by said device identification data which are held in said first identification data storing means and which identify the device transmitting said encrypted reproduction-destined data; and causes said wireless communicating means to transmit the composed packets over said wireless network, wherein said server device further comprises:

schedule inputting means for inputting a schedule list regarding reproduction-destined data to be input in future based on said control data from said client devices;

preset table creating means for creating a preset table for presetting the reproduction-destined data to be input in future based on the input schedule list and on said control data from said client devices; and time counting means for counting time, wherein said second controlling means of said server device causes the preset reproduction-destined data to be input selectively through said inputting means based on said preset table and on the time counted by said time counting means.

2. The wireless data transmitting and receiving system according to claim 1, wherein each said server device further comprises reproduction-destined data storing means for storing said reproduction-destined input data; and wherein said second controlling means of said server device causes said reproduction-destined input data to be stored into said reproduction-destined data storing means based on said control data from the respective client device.

3. The wireless data transmitting and receiving system according to claim 2, wherein said server device transmits said reproduction-destined data stored in said reproduction-destined data storing means to the respective client device based on said control data from said client device.

4. The wireless data transmitting and receiving system according to claim 2, wherein said reproduction-destined data stored in said reproduction-destined data storing means are the data compressed by said compressing means.

5. The wireless data transmitting and receiving system according to claim 1, wherein said server device has a plurality of inputting means; and wherein said second controlling means of said server device causes said reproduction-destined data to be input through said plurality of inputting means in a standby state based on said control data from said plurality of client devices.

6. The wireless data transmitting and receiving system according to claim 1, wherein the reproduction-destined data input through said inputting means of said server device include reproduction restriction information, wherein said first controlling means of each of said client devices transmits to said server device user attributes input through said operating means of the respective client device, and wherein said second controlling means of said server device determines whether to transmit the reproduction-destined input data to each of said client devices based on said user attributes sent from said client devices and on said reproduction restriction information included in said reproduction-destined data.

7. The wireless data transmitting and receiving system according to claim 1, wherein one of the client devices outputs a reference signal that serves as a basis for counting time over said wireless network and remaining client devices transmit signals based on said reference signal.

8. A server device connected wirelessly to a plurality of client devices constituting a wireless network, said server device transmitting and receiving data packets to and from the wirelessly connected client devices on a time division basis over said wireless network, wherein each of said client devices transmits data packets constituted by control data used by the respective client device to request said server device to transmit data destined for reproduction and by unique identification data identifying the requesting client device, said requesting client device further selecting from the received packets those packets addressed to the respective client device and extracting from the selected packets said data destined for reproduction, said server device comprising:

wireless communicating means for wirelessly transmitting and receiving data packets to and from the wirelessly connected plurality of client devices over said wireless network;

identification data storing means for storing device identification data unique to each of the plurality of client devices connected wirelessly to said wireless network;

packet evaluating means for evaluating the packets received by said wireless communicating means so as to extract from the received packets only those packets addressed to the respective client device based on said device identification data stored in said identification data storing means;

identification data holding means for also holding the device identification data for identifying the client device that transmitted the extracted packets;

encryption key storing means for storing an encryption key shared only by the client devices connected to said wireless network, said encryption key being used to encrypt and decrypt the data communicated over said wireless network;

decrypting means for decrypting encrypted control data transmitted in the data packets by use of said encryption key stored in said encryption key storing means;

inputting means for inputting data destined for reproduction by said client devices;

compressing means for compressing the reproduction-destined input data;

encrypting means for encrypting the compressed reproduction-destined data based on said encryption key stored in said encryption key storing means;

packet composing means for composing the encrypted reproduction-destined data into data packets each furnished with said device identification data stored in said identification data storing means and with device identification data designating the client device receiving said encrypted reproduction-destined data;

controlling means which, based on the control data extracted by said packet evaluating means and decrypted by said decrypting means, causes said inputting means to input the reproduction-destined data as designated by said control data, causes said encrypting means to encrypt the reproduction-destined input data by use of said encryption key stored in said encryption key storing means, causes said packet composing means to compose packets to be transmitted, each of the composed packets being constituted by the encrypted reproduction-destined data, by said device identification data which are held in said identification data holding means and which identify the client device that transmitted said control data, and by said device identification data which are held in said identification data storing means and which identify the client device transmitting said encrypted reproduction-destined data, and causes said wireless communicating means to transmit the composed packets over said wireless network;

schedule inputting means for inputting a schedule list regarding reproduction-destined data to be input in future based on said control data from said client devices;

preset table creating means for creating a preset table for presetting the reproduction-destined data to be input in future based on the input schedule list and on said control data from said client devices; and time counting means for counting time, wherein said controlling means causes the preset reproduction-destined data to be input selectively through said inputting means based on said preset table and on the time counted by said time counting means.

9. The server device according to claim 8, further comprising reproduction-destined data storing means for storing said reproduction-destined input data, wherein said controlling means causes said reproduction-destined input data to be stored into said reproduction-destined data storing means based on said control data from the respective client device.

10. The server device according to claim 9, wherein said server device transmits said reproduction-destined data stored in said reproduction-destined data storing means to the respective client device based on said control data from said client device.

11. The server device according to claim 9, wherein said reproduction-destined data stored in said reproduction-destined data storing means of said server device are the data compressed by said compressing means.

12. The server device according to claim 8, further comprising a plurality of inputting means, wherein said controlling means causes said reproduction-destined data to be input through said plurality of inputting means in a standby state based on said control data from said plurality of client devices.

13. The server device according to claim 8, wherein the reproduction-destined data input through said inputting means include reproduction restriction information, wherein each of said client devices transmits to said server device user attributes input through said operating means of the respective client device, and wherein said controlling means determines whether to transmit the reproduction-destined input data to each of said client devices based on said user attributes sent from said client devices and on said reproduction restriction information included in said reproduction-destined data.

14. A server device controlling method for controlling a server device connected wirelessly to a plurality of client devices constituting a wireless network, said server device wirelessly transmitting and receiving data packets to and from said plurality of client devices on a time division basis over said wireless network, wherein each of said plurality of client devices transmits packets each constituted by control data used by the client device in question to request said server device to transmit data destined for reproduction and by unique identification data identifying the requesting client device, said requesting client device further selecting from the received data packets those data packets addressed to the respective client device and extracting from the selected data packets the reproduction-destined data, said server device controlling method comprising the steps of:

causing said server device to receive data packets from the wirelessly connected plurality of client devices over said wireless network;

extracting from the received data packets only those data packets addressed to the client device based on device identification data included in each data packet and unique to each of the plurality of client devices connected wirelessly to said wireless network;

separating from the extracted packets the device identification data for identifying the device that transmitted said extracted packets and retaining the separated device identification data;

decrypting encrypted control data transmitted in the data packets by use of an encryption key shared only by the devices connected to said wireless network upon encrypting and decrypting data communicated over said wireless network;

extracting data to be transmitted to said requesting client device out of reproduction-destined input data based on the decrypted control data, the extracted data being input selectively;

compressing the reproduction-destined data selectively input;

encrypting the compressed reproduction-destined data based on said encryption key;

composing packets each constituted by the encrypted reproduction-destined data, by said device identification data, and by said device identification data that was retained;

transmitting the data packets thus composed over said wireless network;

acquiring a schedule list regarding reproduction-destined data to be input in future based on said control data from said client devices;

creating a preset table for presetting the reproduction-destined data to be input in future based on the acquired schedule list and on said control data from said client devices; and selectively inputting in a timed manner the preset reproduction-destined data based on said preset table.

15. The server device controlling method according to claim 14, wherein said server device further comprises reproduction-destined data storing means for storing said reproduction-destined input data and further comprising the step of causing said reproduction-destined input data to be stored into said reproduction-destined data storing means based on said control data from the respective client device.

16. The server device controlling method according to claim 15, further comprising the step of causing said server device to transmit said stored reproduction-destined data to the respective client device based on said control data from said client device.

17. The server device controlling method according to claim 14, wherein the reproduction-destined input data include reproduction restriction information and further comprising the steps of:

allowing each of said client devices to transmit to said server device user attributes input through operating means of the respective client device; and causing said server device to determine whether to transmit said reproduction-destined input data to each of said client devices based on said user attributes sent from said client devices and on said reproduction restriction information included in said reproduction-destined data.

* * * * *